(12) United States Patent
Slyfield, Jr. et al.

(10) Patent No.: US 12,116,225 B2
(45) Date of Patent: Oct. 15, 2024

(54) APPARATUS, SYSTEMS, AND METHODS FOR SECURING PIPE INLETS OF STATIONARY VESSELS

(71) Applicant: Siros Intelligence LLC, Highland, IN (US)

(72) Inventors: Craig Richard Slyfield, Jr., Encinitas, CA (US); Lucas Lawrence Lasche, Highland, IN (US); Vishnu Siddharth Raju Mantina, Chicago, IL (US)

(73) Assignee: Siros Intelligence LLC, Highland, IN (US)

( * ) Notice: Subject to any disclaimer, the term of this patent is extended or adjusted under 35 U.S.C. 154(b) by 0 days.

(21) Appl. No.: 18/437,567

(22) Filed: Feb. 9, 2024

(65) Prior Publication Data

US 2024/0270517 A1     Aug. 15, 2024

Related U.S. Application Data

(60) Provisional application No. 63/444,297, filed on Feb. 9, 2023.

(51) Int. Cl.
*B65G 65/32*     (2006.01)
*G06Q 10/0832*   (2023.01)

(52) U.S. Cl.
CPC ......... *B65G 65/32* (2013.01); *G06Q 10/0832* (2013.01)

(58) Field of Classification Search
CPC ..... F16L 55/1157; F16L 55/115; B65G 65/38; B65G 65/34; B65G 65/32

USPC ............................................. 138/92, 94.5, 89
See application file for complete search history.

(56) References Cited

U.S. PATENT DOCUMENTS

| | | | |
|---|---|---|---|
| 4,351,446 A * | 9/1982 | Madden | F16L 55/1157 70/168 |
| 8,954,189 B2 | 2/2015 | Zimmerman et al. | |
| 9,995,076 B1 | 6/2018 | Hoffberg | |
| 10,480,216 B2 | 11/2019 | Lim et al. | |
| 2018/0010724 A1* | 1/2018 | Kozak | F16L 55/11 |
| 2018/0240292 A1 | 8/2018 | Chen | |
| 2019/0366289 A1* | 12/2019 | Mitchell | F16L 55/115 |
| 2021/0082221 A1 | 3/2021 | Zhang et al. | |

FOREIGN PATENT DOCUMENTS

| | | |
|---|---|---|
| KR | 10-1491127 B1 | 2/2015 |
| KR | 10-2021-0156631 A | 12/2021 |

* cited by examiner

*Primary Examiner* — Glenn F Myers
(74) *Attorney, Agent, or Firm* — Greenberg Traurig, LLP

(57) ABSTRACT

An apparatus for securing storage vessel inlet pipes may include (i) an actuator, configured to be anchored to an inlet pipe that includes a movable portion, (ii) a cap lock configured to secure to a cap for the inlet pipe and that (a) secures to the movable portion of the actuator when the actuator is in an extended position and (b) releases from the actuator when the movable portion is retracted, and (iii) a control unit configured to, in response to receiving an unlock signal, trigger the actuator to retract the movable portion of the actuator.

20 Claims, 15 Drawing Sheets

APPARATUS, SYSTEMS, AND METHODS FOR SECURING PIPE INLETS OF STATIONARY VESSELS

CROSS-REFERENCE TO RELATED PATENT APPLICATION

This application claims the benefit of U.S. Provisional Patent Application No. 63/444,297, filed 9 Feb. 2023, the entire contents of which are hereby incorporated by this reference.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
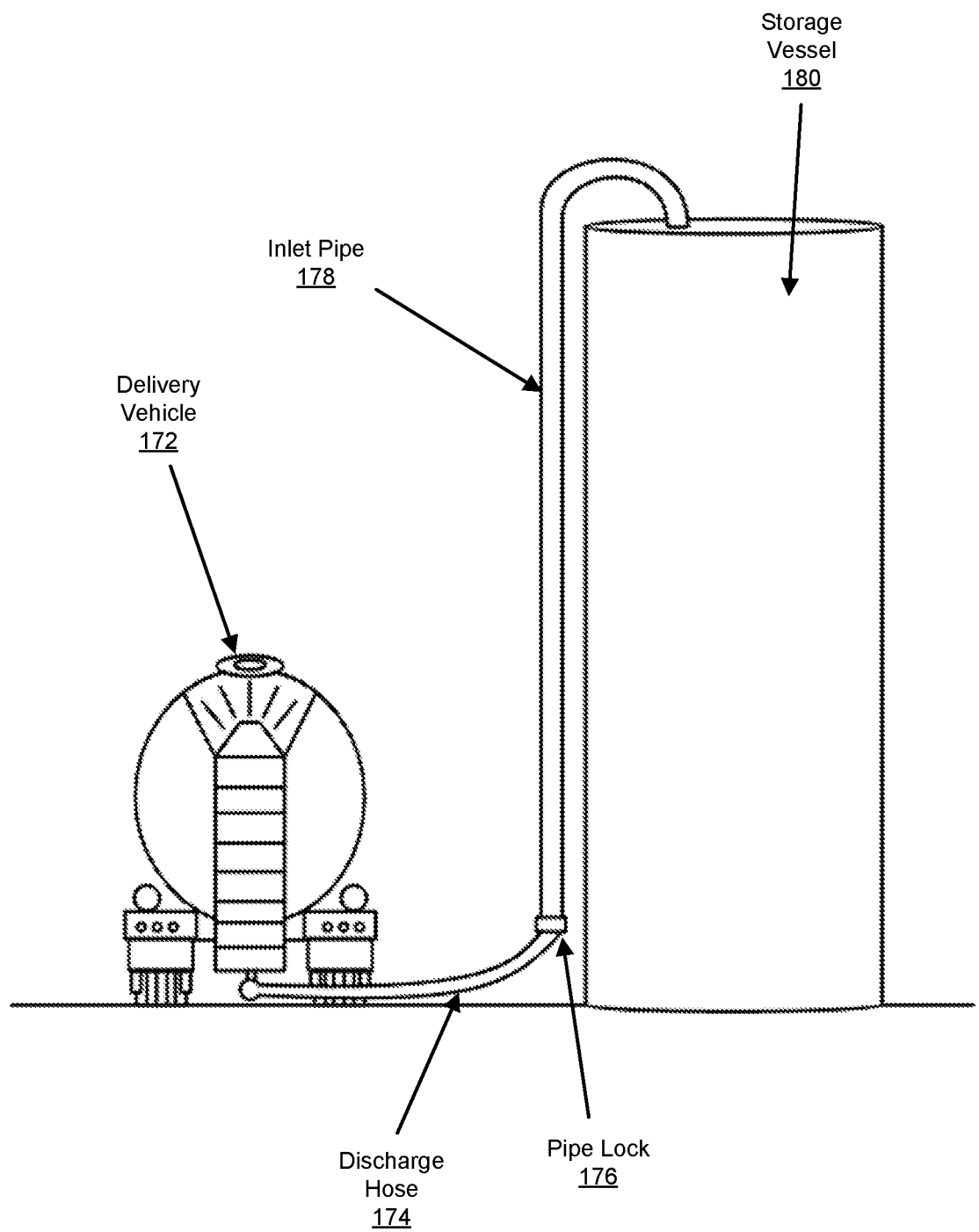
FIG. 1 is a schematic diagram of a delivery vehicle configured to unload material into a stationary storage vessel.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

Features from any of the embodiments described herein may be used in combination with one another in accordance with the general principles described herein. These and other embodiments, features, and advantages will be more fully understood upon reading the following detailed description in conjunction with the accompanying drawings and claims.

DETAILED DESCRIPTION

The present disclosure is generally directed to an apparatus, systems, and methods for securing pipe inlets of stationary vessels. Supply chains are a vital part of the economy and delivery of bulk commodities for manufacturing is at the front of the complex chain. Many dry and liquid bulk commodities are transported in unpackaged parcels to manufacturers via truck, railcars, containers, and the like. Bulk commodities may be or may include dry food products such as starches, sugars, grains, flours, etc., or liquid food products such as milk, syrups, juices, etc. Bulk commodities may be or may include plastics or components thereof such as resins used for manufacturing parts like auto parts, containers, packaging, medical equipment, and/or other consumer goods. Other bulk commodities may include chemicals or other inedible materials such as cement, fuels, surfactants, solvents, aqueous solutions, sand, rock, minerals, etc. that may be used in energy industries, water treatment, emission control, construction, or other industries. Because these commodities are shipped in large unpackaged quantities, they are highly regulated to avoid spillage, contamination, sabotage or theft.

A purchaser of bulk commodities may rely upon a supplier of bulk materials to properly package, prepare, ship, and/or deliver a shipment of bulk commodities. Unlike packaged deliveries that may be received and inspected for correctness and quality prior to receipt or consumption, receiving of bulk commodities in large non-parcel quantities (e.g., around 10 to over 50 thousand pounds) is difficult to inspect and sample for quality at the time of delivery. The delivery vessels containing bulk materials may be unloaded upon delivery via pumps, blowers, and/or other methods into large stationary storage vessels (e.g., silos), which may hold multiple deliveries worth of material. Failure to properly direct the correct materials at the time of delivery into the correct storage vessel may unintentionally mix and ruin all material in a large receiving vessel. This failure may not only result in loss of purchased product already in the storage vessel but may also result in shutting down manufacturing lines that rely on the ingredients in the storage vessel for finished products. The costs and delays of an improper delivery may be substantial for the manufacturer. Delivery of wrong materials into a storage vessel may occur because of, for example, delivery to a wrong plant, delivery of wrong material, and/or connection and unloading of material to a wrong storage vessel at a plant.

Existing methods to ensure that materials are stored in the correct storage vessel may rely on manual supervisor sign-off and/or multi-key padlocks on storage vessel inlet pipe caps to require more than one individual to approve the delivery. However, these systems often require manual unlocking and thus waste the time of both manufacturing personnel as well as delivery drivers. Such systems are also prone to error, resulting in unintentional mixing of materials, rendering the materials stored in the storage vessel unfit for use.

An apparatus as described herein may be configured to secure existing storage vessel pipe caps with an electronic lock to improve various logistics workflows by automating the receiving sign-off and storage vessel unlocking process for delivery of bulk commodities. Such an electronic lock may be used to selectively unlock the appropriate inlet pipe for the correct storage vessel to accept a given delivery, thereby minimizing the possibility of human error and reducing the need for personnel to spend time physically unlocking storage vessel inlets so that delivery drivers can unload their cargo. The electronic lock may include an electric lock (e.g., a retractable rod, rotating disc lock, etc.) that may be unlocked by a controller unit in response to a driver checking in at the delivery site via, for example, a mobile app. The apparatus may also be configured with a mechanical (e.g., non-electronic) self-latching lock affixed to the pipe cap, ensuring that delivery drivers are able to quickly secure the storage vessel inlet pipe when their delivery is complete. Various components of the apparatus may be configured to secure to existing storage vessel inlet pipes, pipe caps, and other infrastructure, thus allowing for installation of the pipe locks without requiring a major overhaul of a manufacturer's storage systems.

FIG. 1 shows a schematic diagram of an example delivery process. As shown in FIG. 1, a delivery vehicle 172 may connect to an inlet pipe 178 of a storage vessel 180 via a discharge hose 174 that may be connected to inlet pipe 178. Discharge hose 174 may be configured to connect to storage vessel 180 through inlet pipe 178, with a junction at one end of the unloading pipe that is typically secured with a cap, commonly referred to as a 'dust cap'. The dust cap of inlet pipe 178 may be secured using a pipe lock 176, the features and functions of which will be described in greater detail below. Delivery vehicle 172 may be a truck, railcar, or any other vehicle for shipping bulk goods between locations.

Figure 2:
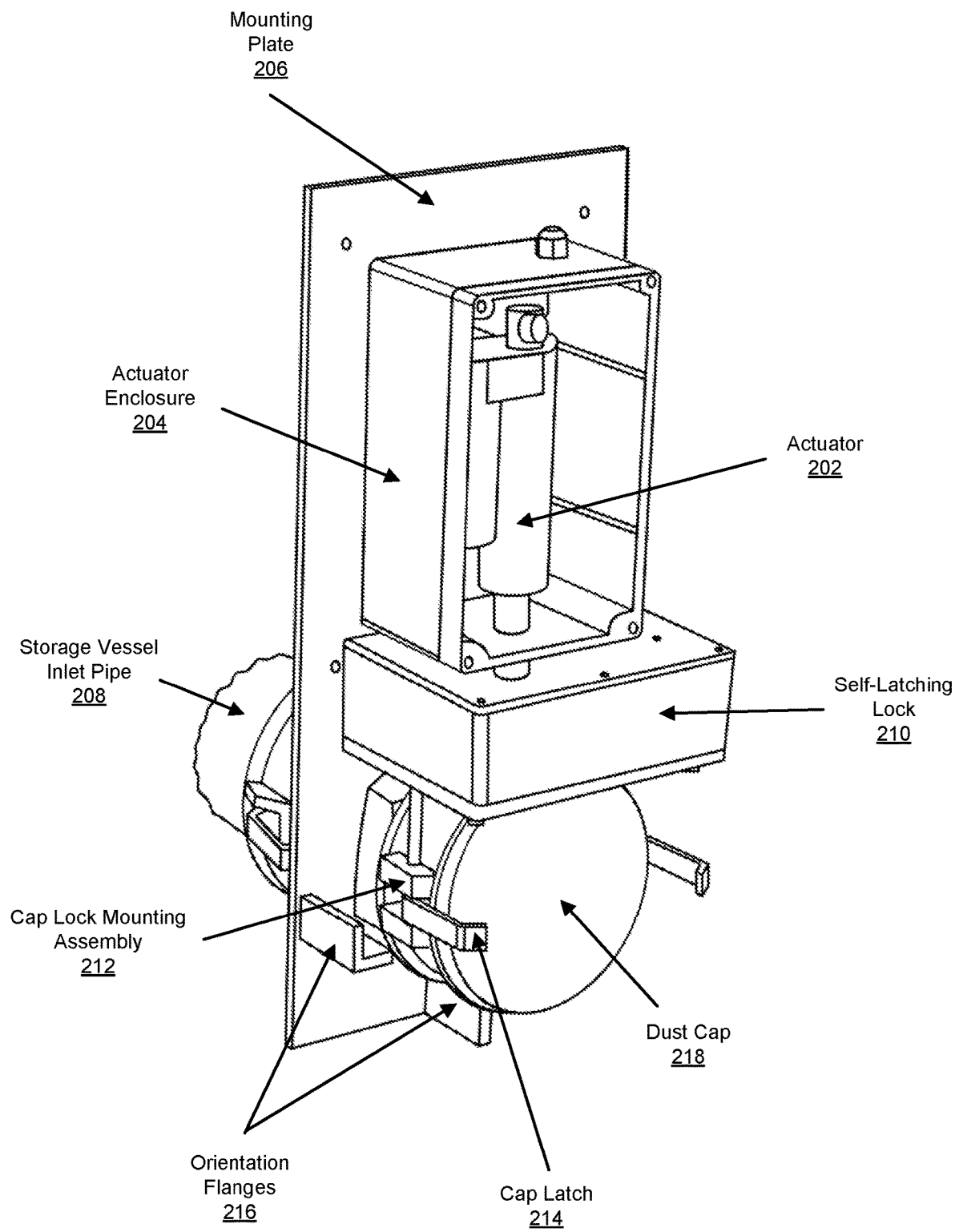
FIG. 2 is a schematic diagram of an example electronic pipe lock in accordance with various embodiments described herein.

FIG. 2 is a schematic diagram of an example inlet pipe locking system in accordance with various embodiments described herein. As shown in this schematic diagram, the system includes a mounting plate 206 that may be affixed to a storage vessel inlet pipe 208. Mounting plate 206 may be secured in position relative to the inlet pipe in a variety of ways, including being fastened by bolts to a framework, welding, being screwed on behind the inlet pipe port, or any other suitable mechanism for structurally supporting the actuator assembly in a desired position. Mounting plate 206 may be configured to provide structural support to an actuator 202 housed within an actuator enclosure 204.

The system may also include a cap lock assembly configured to secure dust cap 218 to an extendable or movable portion of actuator 202 and, by extension, to the end of storage vessel inlet pipe 208 to prevent discharge hoses from being connected while dust cap 218 of storage vessel inlet pipe 208 is locked to the storage vessel inlet pipe 208. The cap lock assembly may fasten to existing pipe caps with cap latches 214, which are sometimes referred to as 'dog ear latches' or 'cam lock latches.' The cap lock assembly may also include a cap lock mounting assembly 212 that secures a self-latching lock 210 to dust cap 218. Self-latching lock 210 may lock to the extensible portion of actuator 202, thereby allowing a user such as a delivery driver or site coordinator to lock storage vessel inlet pipe 208 simply by pressing dust cap 218 into place, causing self-latching lock 210 to engage with an extended portion of actuator 202. Self-latching lock 210 may be contained within a weather-resistant housing that includes a groove (not visible in FIG. 2, but see cover groove 722 and enclosure groove 726 in FIG. 7) to allow self-latching lock 210 to engage with the actuator shaft of actuator 202.

As shown in FIG. 2, mounting plate 206 may include additional features to ensure that dust cap 218 (and by extension self-latching lock 210) is oriented properly so that self-latching lock 210 may engage with actuator 202, thereby adding a layer of protection against users forgetting to lock the cap or against malicious actors from deliberately improperly securing the cap. For example, mounting plate 206 may include brackets, grooves, stops, cuts, or other mechanical features aligned to ensure that the cap will not secure to the inlet pipe unless the locking mechanism is in the correct orientation to engage with the actuator. These features are illustrated in FIG. 2 as orientation flanges 216, and in this example consist of a set of flanges built into mounting plate 206 to ensure that dust cap 218 may only be secured to storage vessel inlet pipe 208 when dust cap 218 is in an orientation that will allow self-latching lock 210 to engage with actuator 202. Although flanges are illustrated here in FIG. 2, other variations on features to ensure proper cap orientation may be included. For example, the enclosure of self-latching lock 210 may include pins configured to socket into indentations in mounting plate 206. Other embodiments may include other arrangements of indentations, protrusions, pins, bars, or other physical features to ensure that dust cap 218 and self-latching lock 210 are secured in the correct orientation.

The cap lock assembly may be fastened to the cap through cam locks, pins, bolts, or any other suitable means of nondestructively attaching to dust cap 218. In the example of FIG. 2, cap lock mounting assembly 212 includes self-latching lock 210 affixed to a base plate, with two long screws connecting the base plate to cap latches 214. Cap latches 214 include cams that engage with a circular groove around the circumference of dust cap 218. Such circular cap grooves, or adapter fittings, are a feature present in many existing dust caps, thus allowing maintenance personnel to easily affix the cap lock assembly to existing inlet pipe architecture without requiring specialized tools. The screws may slot through holes in the cap latches, thereby allowing for additional closure support as well as allowing for a receiver to employ additional security methods such as padlocks and/or uniquely numbered security seals that may prevent cap lock mounting assembly 212 from being removed from dust cap 218 without leaving visible indications of removal. Self-latching lock 210 may be a mechanical or non-electric lock. For example, the self-latching lock may include springs that cause the lock to secure to actuator 202 when pressed into position.

Actuator 202 may be controlled by and/or may include a motor, solenoid, or other suitable mechanisms and may be extended or retracted in response to signals from a control unit, which will be described in greater detail below. When actuator 202 is in an extended position, self-latching lock 210 may fasten to actuator 202 when dust cap 218 is pressed closed against storage vessel inlet pipe 208. When actuator 202 is in a retracted position, actuator 202 may disengage from self-latching lock 210, allowing delivery drivers to remove dust cap 218 from storage vessel inlet pipe 208 and connect discharge hoses to storage vessel inlet pipe 208. In embodiments where the actuator includes a solenoid and spring that drive a linear actuator and/or actuator shaft, the actuator may fail secure (e.g., the spring may drive the actuator shaft into an extended position when power is not being provided to the solenoid), thus ensuring that the pipe inlet is secured in the event of a system failure or power outage. A fail-secure system may help secure the pipe lock assembly against tampering or improper opening of storage vessels during power failures, though manual opening methods may be integrated into the cap lock (such as traditional key locks) so that the dust cap may still be removed from the pipe inlet even in the event of a system failure or power outage.

Although the illustrations provided herein show a linear rod-type actuator controlled by a solenoid and spring, any suitable form factor of actuator may be used. For example, the actuator may include a rotary actuator, cam actuator, or any other suitable actuator with an extendable portion that may engage with a self-latching lock. In some embodiments, actuators may move between a first position and a second position. In the example of a linear actuator that includes a shaft, the first position may be an extended position of the shaft where the shaft protrudes from the actuator housing, and the second position may be a retracted position of the shaft where the shaft is retracted into the actuator housing.

Figure 3:
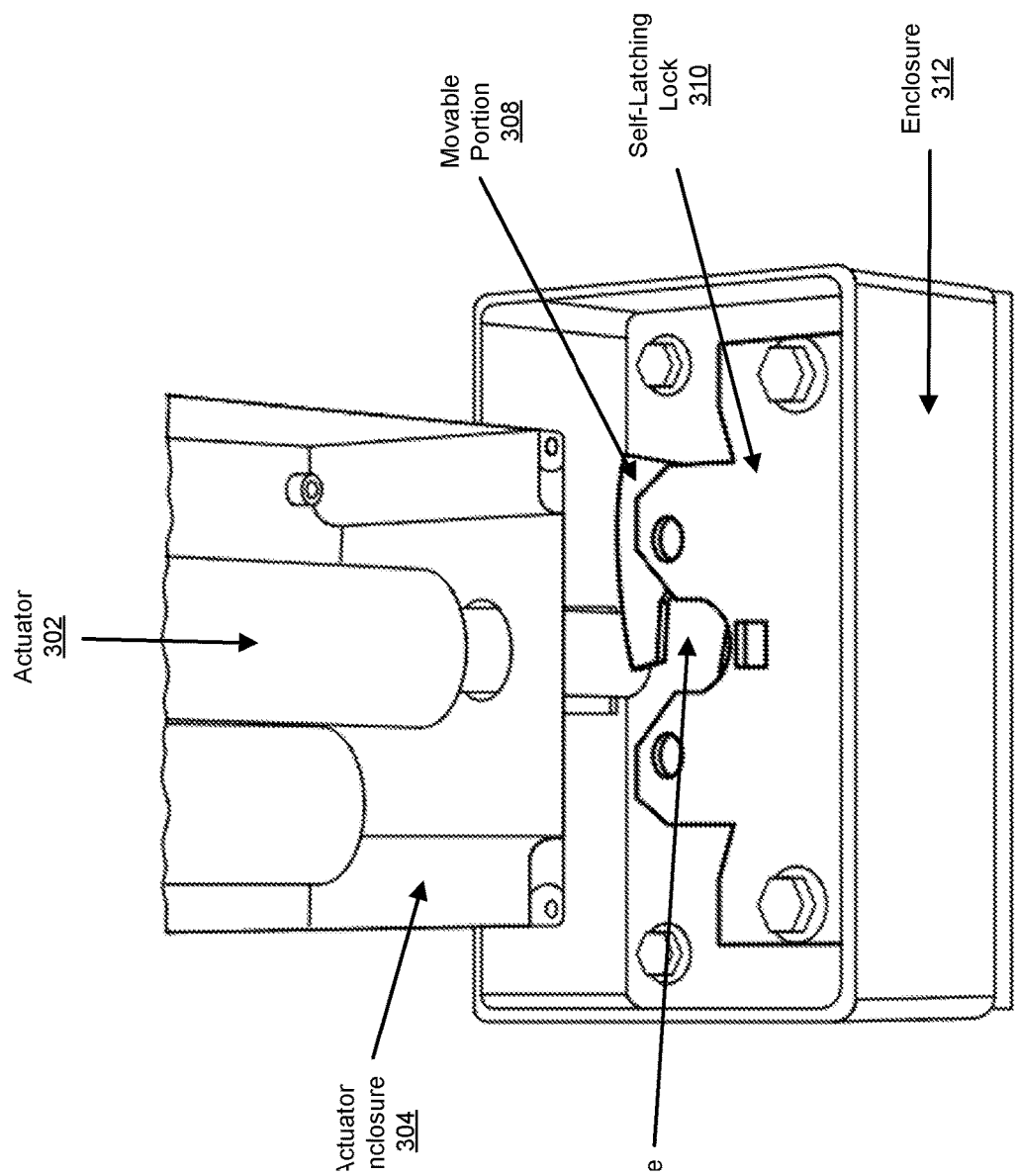
FIG. 3 is a schematic diagram showing an actuator component of an example electronic pipe lock in an extended position and the lock not latched to the actuator component in accordance with various embodiments described herein.

FIG. 3 is a schematic diagram illustrating a close-up view of the interior of a self-latching lock mechanism. As shown in FIG. 3, a pipe lock system can include an actuator and a self-latching lock. As illustrated in FIG. 3, a pipe lock system can include an actuator 302 within an actuator enclosure 304. As with other actuator enclosures illustrated herein, actuator enclosure 304 is illustrated without a front cover or faceplate. In some embodiments, actuator enclosure 304 may include a face plate that may be screwed on, bolted, or otherwise attached to the remainder of actuator enclosure 304 to protect actuator 302 against the elements and/or tampering. Actuator 302 may be configured to engage with a self-latching lock 310 that is housed within an enclosure 312.

A geometry of self-latching lock 310 may be configured such that a movable portion 308 of self-latching lock 310 is pushed aside when self-latching lock 310 is pressed against actuator 302 (e.g., when the associated dust cap is pressed into position against a corresponding inlet pipe or similar). Movable portion 308 may be connected to a spring that causes movable portion 308 to lock into place when actuator 302 is fully within lock aperture 306, and the geometry of movable portion 308 may be configured such that self-latching lock 310 cannot be withdrawn from actuator 302 along the axis of movement of the associated dust cap without first retracting actuator 302 along a perpendicular axis (e.g., up vs. out). In some examples, a geometry of movable portion 308 may include a sloped or angled leading edge that enables the force of being pressed against an actuator to move movable portion 308 to the side. Meanwhile, a geometry of lock aperture 306 may be configured to fit snugly around actuator 302 when actuator 302 is fully enclosed within lock aperture 306 and not enable actuator 302 to push movable portion 308 to the side even if force is applied to self-latching lock 310 in an attempt to pull it away from actuator 302. In various embodiments, the actuator and self-latching lock components may be switched. For example, the actuator may be located in an enclosure attached to the dust cap while the self-locking latch is located in an enclosure attached to the storage vessel inlet pipe. In various embodiments, a battery that powers the actuator may be accessible (e.g., removed, replaced, etc.) only while the pipe lock is unlocked (e.g., while the dust cap is removed from the pipe) so that the battery may only be replaced or otherwise adjusted while the pipe lock is unlocked or the dust cap is not attached to the storage vessel inlet pipe.

Figure 4:
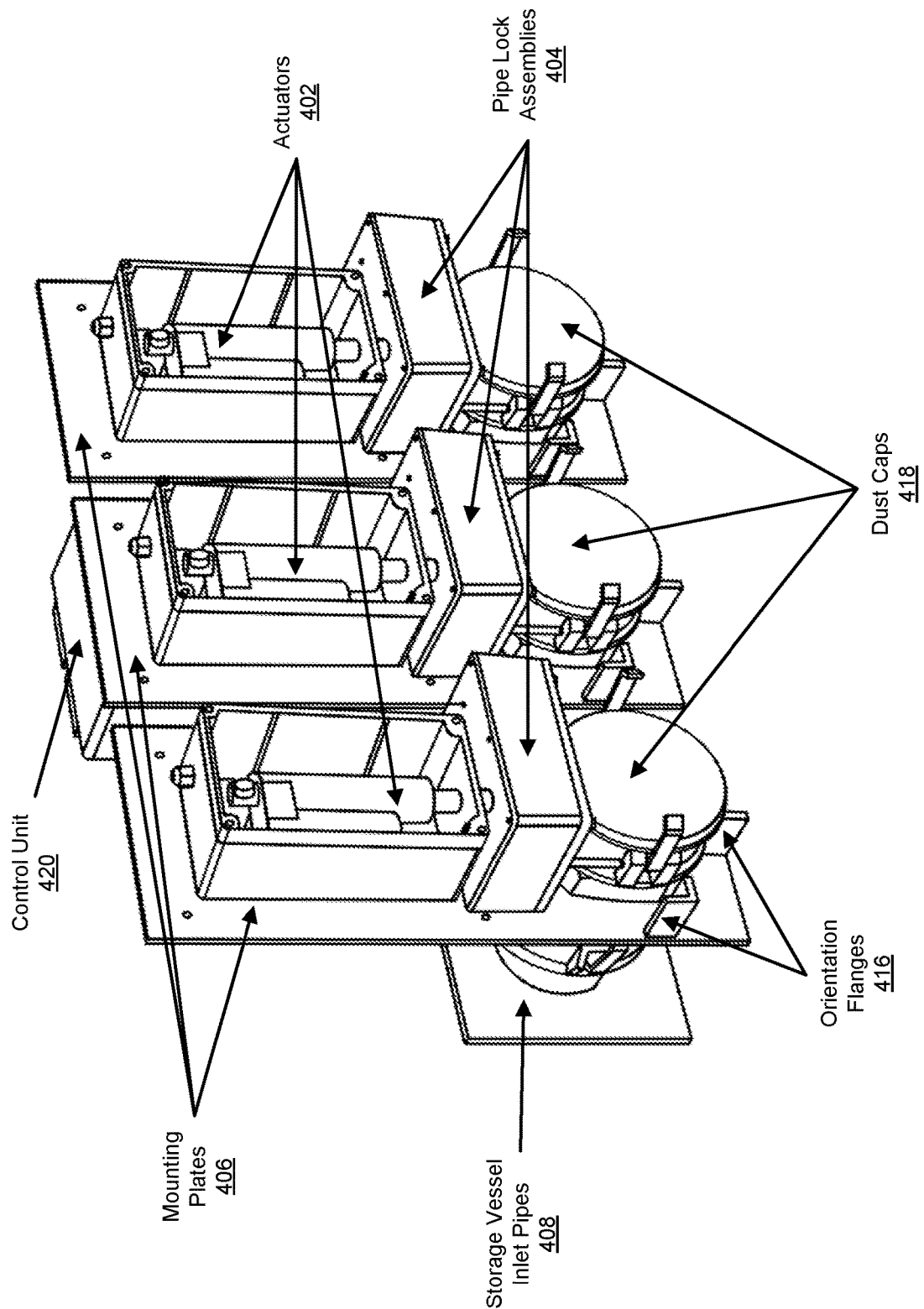
FIG. 4 is a schematic diagram of an array of pipe inlets for a corresponding array of stationary vessels, the pipe inlets being equipped with caps in accordance with various embodiments described herein.

FIG. 4 is an illustration of an example array of inlet pipes in accordance with various embodiments described herein. As shown in FIG. 4, a set of storage vessel inlet pipes (illustrated as storage vessel inlet pipes 408) may be in proximity to each other in a larger array of inlet pipes, or simply as a standalone set of inlet pipes that are physically close to each other. In some examples, each individual inlet pipe may have its own mounting plate while in other embodiments a single mounting plate may be configured to provide structural support for cap locks for each storage vessel inlet pipe. In the example of FIG. 4, each storage vessel inlet pipe has its own mounting plate, and the mounting plates are collectively illustrated as mounting plates 406. Regardless of how the mounting plate or mounting plates are configured, each inlet pipe may have its own actuator 402 housed within an actuator enclosure 404 that is secured to the mounting plate or plates.

Each of the storage vessel inlet pipes 408 may have a corresponding pipe cap, corresponding actuator, and corresponding cap lock. In the example of FIG. 4, each of storage vessel inlet pipes 408 has a corresponding dust cap 418, and each dust cap 418 is secured to its respective cap lock mounting assembly 412 with corresponding cap latches 414 to secure self-latching locks 410 in position relative to each dust cap 418. Similarly, each storage vessel inlet pipe may include orientation flanges 416 to ensure that dust caps 418 are installed correctly when storage vessel inlet pipes 408 are not in use.

The array of storage vessel inlet pipes 408 may also include a control unit 420. Control unit 420, described in greater detail below, may cause any or all of actuators 402 to retract (or otherwise cause one or more of the pipe locks to unlock) by applying a voltage to the solenoid, motor, or other appropriate component of the appropriate actuator. The actuator may be spring-loaded or otherwise configured so that the actuator defaults to the extended position in the absence of a signal from the control unit, thereby preventing deliveries from being loaded into the storage vessel during times when the control unit is not powered or is otherwise unable to confirm the delivery. In some examples, each storage vessel inlet pipe may have its own control unit. In other examples, a single control unit may be configured to activate one or more actuators in an array (such as actuators 402 in FIG. 4) in response to receiving an unlock signal from a mobile device or other device.

Figure 5:
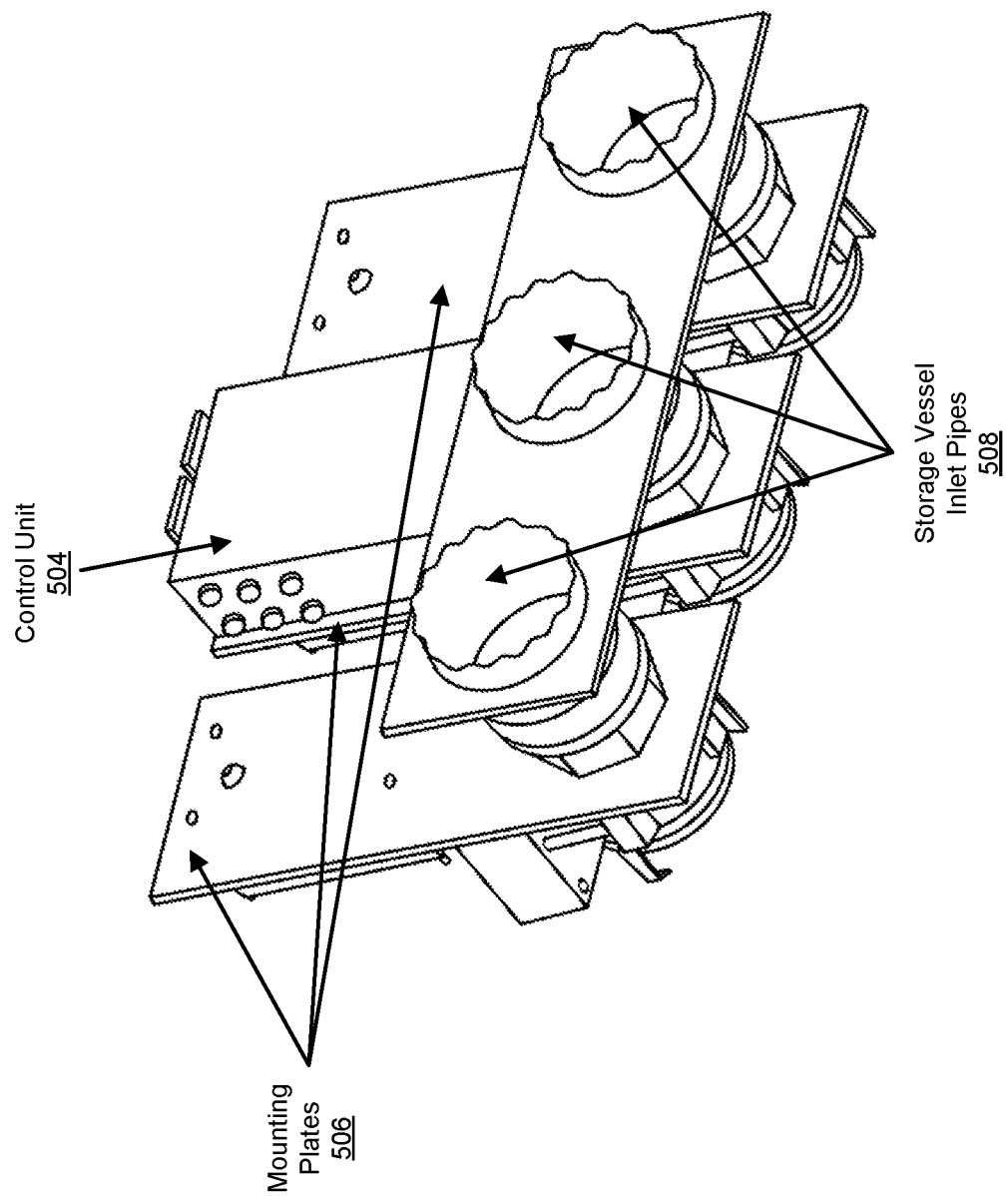
FIG. 5 is a schematic diagram of a rear view of the array of pipe inlets of FIG. 4 in accordance with various embodiments described herein.

FIG. 5 is a backside view of the array of storage vessel inlet pipes illustrated in FIG. 4. As shown in FIG. 5, each storage vessel inlet pipe may be equipped with a mounting plate 506 as described above. Additionally, one particular mounting plate (in this case, mounting plate 506) may additionally support control unit 504 in position near the array of storage vessel inlet pipes. Although control unit 504 is illustrated on the backside of mounting plate 506, control unit 504 may be situated underneath storage vessel inlet pipe 508 or in any other suitable location and/or orientation.

As described above, a control unit such as control unit 504 may include a weatherproof enclosure that houses the controller assembly and internal power sources so that the controller is able to operate on battery power rather than requiring connection to an outlet or other power infrastructure. In some examples, control unit 504 may also include connection ports for connecting actuators to the control unit via a wired or physical connection. The control unit may control the actuators by providing power to a motor, solenoid, or other component of the actuator that causes the extendable or movable portion of the actuator to retract or otherwise disengage from a locking component of a pipe lock system. In other examples, control unit 504 may include short-range wireless antennae to communicate with individual pipe locks, allowing control unit 504 to signal specific actuators to retract via wireless signal.

The control unit may control an array of relays, with each relay in the array corresponding to a control circuit for an actuator that, when activated, provides power to the actuator. The controller itself may thus be able to run on relatively small power source, such as a coin cell battery. Meanwhile, the control circuits for the actuators may connect to a larger battery that may be used only when an inlet pipe needs to be unlocked, thus minimizing the total power draw on the large battery and allowing for a longer period of time before the batteries must be replaced or recharged.

Figure 6:
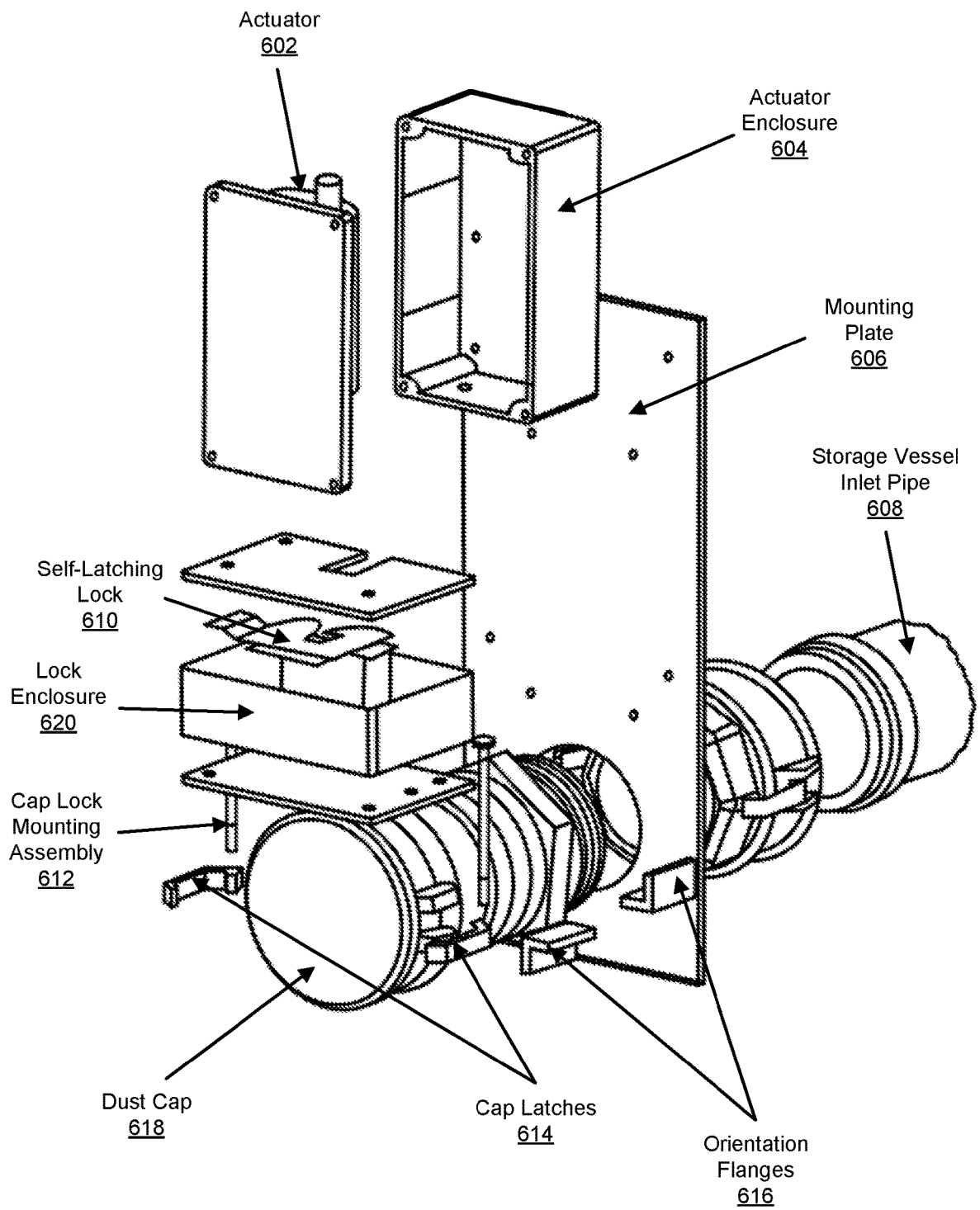
FIG. 6 is a front exploded diagram of an example electronic pipe lock in accordance with various embodiments described herein.

FIG. 6 is a front exploded view of the storage vessel inlet pipe and cap lock system illustrated above. As described in connection with FIGS. 1-5, a storage vessel inlet pipe 608 may be equipped with a pipe lock that secures dust cap 618 in place when storage vessel inlet pipe 608 is not in use, only unlocking in response to an unlock signal from a control device. The pipe lock system may include actuator 602 contained within actuator enclosure 604, which in some examples may be a weatherproof casing affixed to a mounting plate 606, which in turn is secured to the end of storage vessel inlet pipe 608. Mounting plate 606 may also include features such as orientation flanges 616 to ensure that dust cap 618 affixes to the end of storage vessel inlet pipe 608 such that self-latching lock 610 may engage with actuator 602 when actuator 602 is in an extended position.

Dust cap 618 may be equipped with a locking assembly affixed to dust cap 618. This locking assembly may include a lock enclosure 620 that houses self-latching lock 610 and is secured to dust cap 618 by cap lock mounting assembly 612 that secures lock enclosure 620 to dust cap 618 via cap latches 614.

Figure 7:
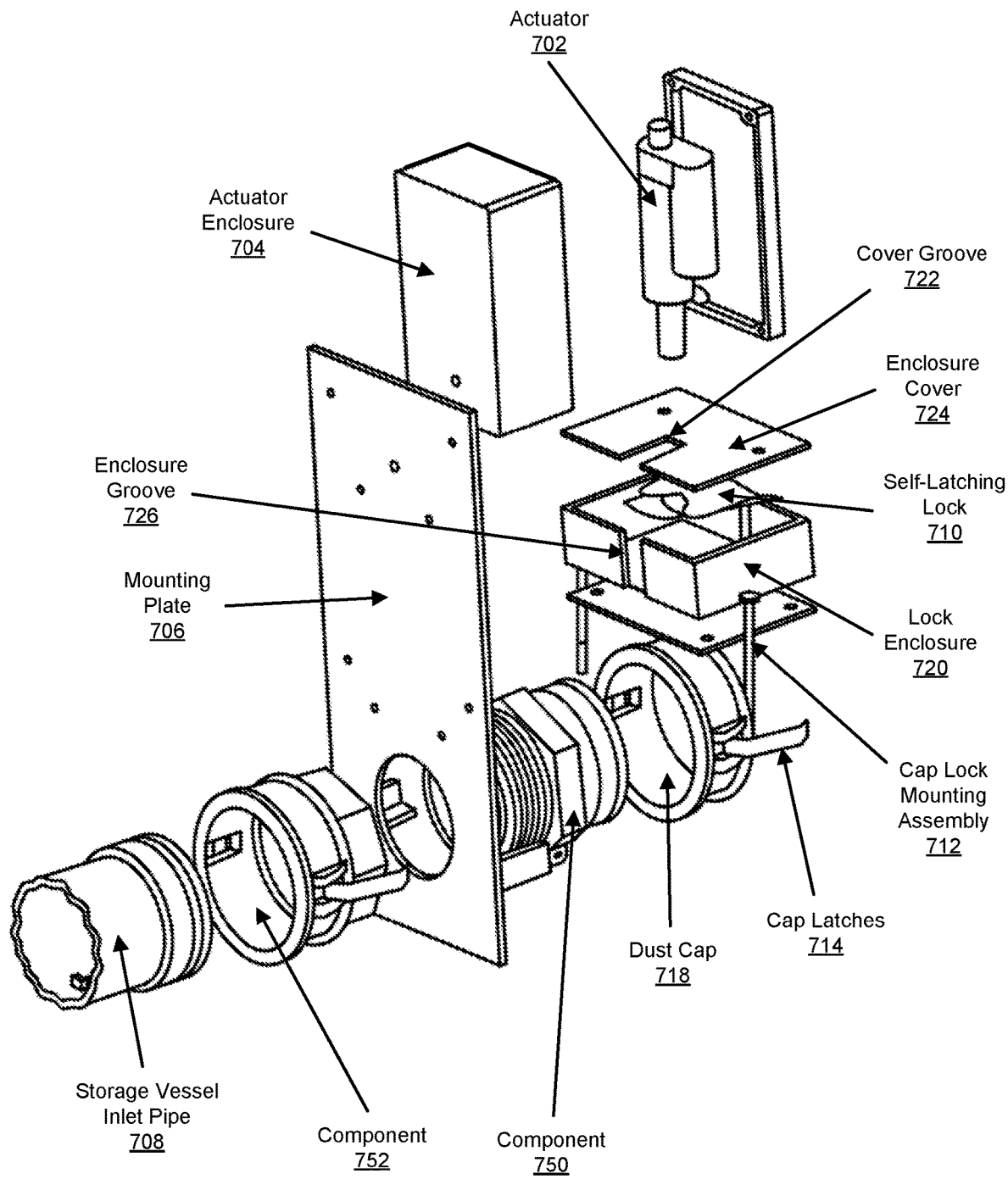
FIG. 7 is a rear exploded diagram of an example electronic pipe lock in accordance with various embodiments described herein.

FIG. 7 is a backside exploded view of the above-described inlet pipe and associated pipe lock system. As with the system illustrated in FIG. 6, the system illustrated in FIG. 7 includes an actuator 702 contained within an actuator enclosure 704 that is mounted to mounting plate 706, which secures actuator enclosure 704 in position relative to an inlet of storage vessel inlet pipe 708 (e.g., component 750). Dust cap 718, which is configured to seal or cover the inlet of storage vessel inlet pipe 708, may be equipped with a cap lock system configured to secure to actuator 702 when actuator 702 is in an extended position. The cap lock system of FIG. 7 includes a lock enclosure 720 that houses a self-latching lock 710 that is configured to secure to actuator 702. Lock enclosure 720 includes an enclosure cover 724 that serves as a lid to protect self-latching lock 710 against tampering, weather, or accidental damage. Lock enclosure 720 and enclosure cover 724 include a cover groove 722 that allows actuator 702 to fit into self-latching lock 710 even though self-latching lock 710 is fully enclosed by lock enclosure 720. Likewise, lock enclosure 720 can include an enclosure groove 726 that, in tandem with cover groove 722, permits actuator 702 to enter lock enclosure 720 and engage with self-latching lock 710. Specifically, cover groove 722 is configured to admit actuator 702 into the interior of lock enclosure 720 such that actuator 702 can engage with self-latching lock 710 while actuator 702 is in an extended position. Lock enclosure 720 is secured to dust cap 718 by cap lock mounting assembly 712, which includes a base plate and screws, nails, rods, or other components configured to secure cap lock mounting assembly 712 to dust cap 718 by way of cap latches 714.

Component 750 and component 752 can secure to an end of storage vessel inlet pipe 708 and couple together through an aperture in mounting plate 706, thereby allowing flanges incorporated into component 750 and component 752 to provide structural support for mounting plate 706. These two components can together act as an adapter to ensure that mounting plate 706 is held firmly in place relative to storage vessel inlet pipe 708, thus eliminating the need for any permanent modifications to storage vessel inlet pipe 708 in order to secure storage vessel inlet pipe 708 using the techniques and mechanisms described herein. Component 752 may include latches, cams, screws, etc. that allow it to engage with storage vessel inlet pipe 708 and lock into place. Component 750 may include screw threads or other features configured to pass through an aperture or hole in mounting plate 706 and engage with corresponding features in 752. In one example, component 750 and component 752 may screw together with mounting plate 706 sandwiched between them, thus causing flanges of component 750 and 752 to press against mounting plate 706 and hold it firmly in place relative to component 750 and 752. Component 750 may include grooves or other features in common with storage vessel inlet pipe 708 that allow it to engage with dust cap 718, thus allowing users to maximize their use of preexisting equipment and minimize the need for modifications to storage vessel inlet pipe 708 in order to secure it with a pipe lock. Both component 750 and component 752 may be hollow, effectively acting as extensions of storage vessel inlet pipe 708. Material being loaded into the corresponding storage vessel may pass through component 750, component 752, and storage vessel inlet pipe 708 on its way into the storage vessel.

Figure 8:
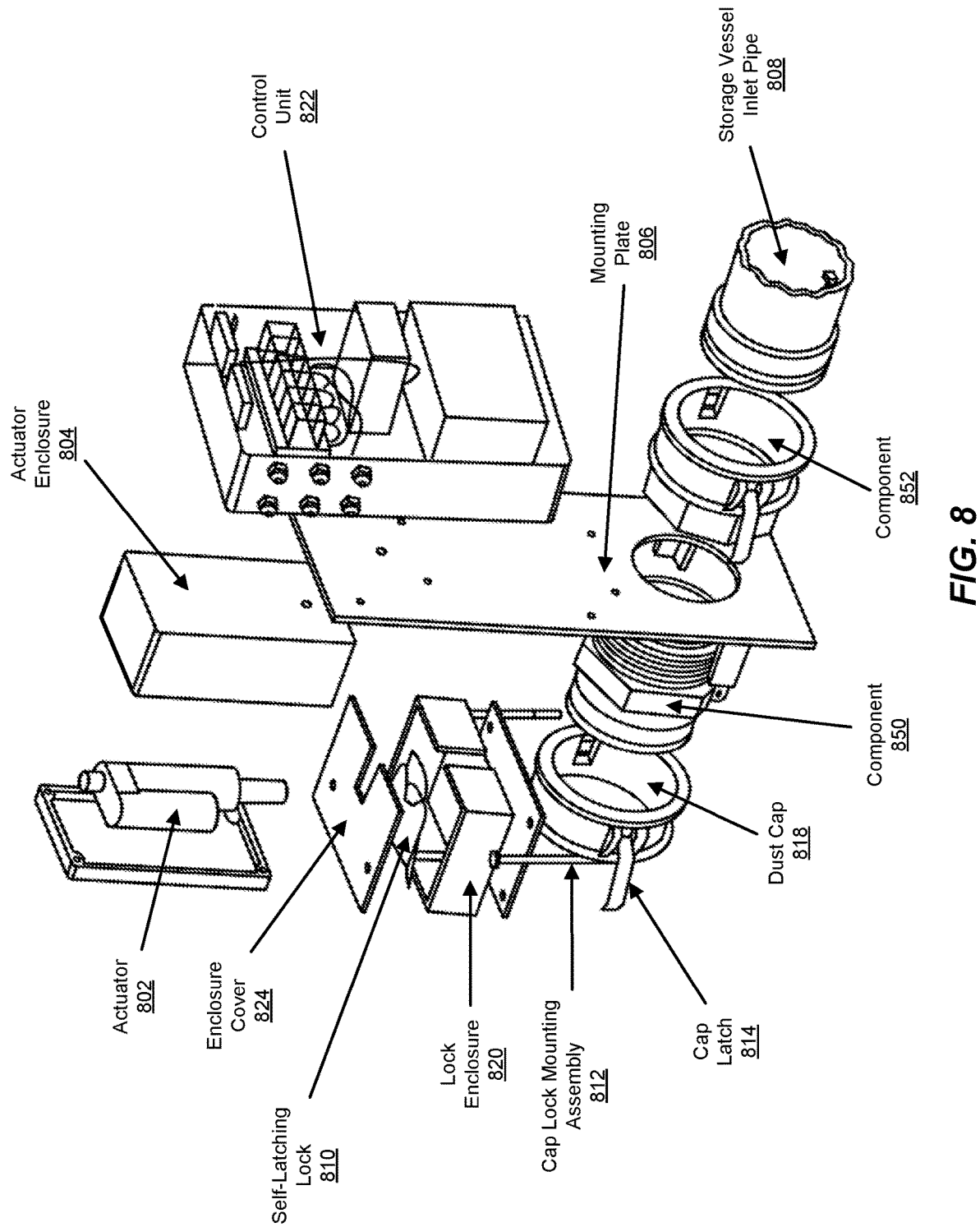
FIG. 8 is a rear exploded diagram of an example electronic pipe lock that includes a control unit, in accordance with various embodiments described herein.

FIG. 8 is an exploded view of a pipe lock system that includes a control unit that is configured to receive unlock signals from a remote device (such as an operator's mobile device) and provide power to an actuator in response to receiving the unlock signal, thereby causing the actuator to retract and disengage from a self-latching lock. Much as with the other pipe lock systems illustrated and described herein, the pipe lock system of FIG. 8 includes an actuator 802 contained within actuator enclosure 804, which is in turn mounted to mounting plate 806. Mounting plate 806 is secured to storage vessel inlet pipe 808 such that actuator 802 may engage with self-latching lock 810 when actuator 802 is in an extended position. Self-latching lock 810 is housed within lock enclosure 820 and secured to dust cap 818 via cap lock mounting assembly and cap latches 814. As with lock enclosure 720, lock enclosure 820 may also include an enclosure cover 824 that serves to close lock enclosure 720 and protect self-latching lock 810. Lock enclosure 820 and enclosure cover 824 may also include grooves, cutouts, or similar apertures that permit actuator 802 to slide into lock enclosure 820 to engage with self-latching lock 810 when dust cap 818 is pressed into place against storage vessel inlet pipe 808. The system illustrated in FIG. 8 also includes a component 850 and a component 852, which are configured in a manner similar to component 750 and 752 as described above.

The system of FIG. 8 also includes a control unit 822 which is electronically coupled to actuator 802 (e.g., via a cable) such that control unit 822 may provide power to actuator 802. Actuator 802 may be configured to enter a retracted state when receiving power from control unit 822 and enter an extended state when not receiving power from control unit 822. This configuration may prevent the cap lock system from being circumvented via cutting power to the system, as the system will default to a locked state when the control unit is not providing power to actuator 802.

Figure 9:
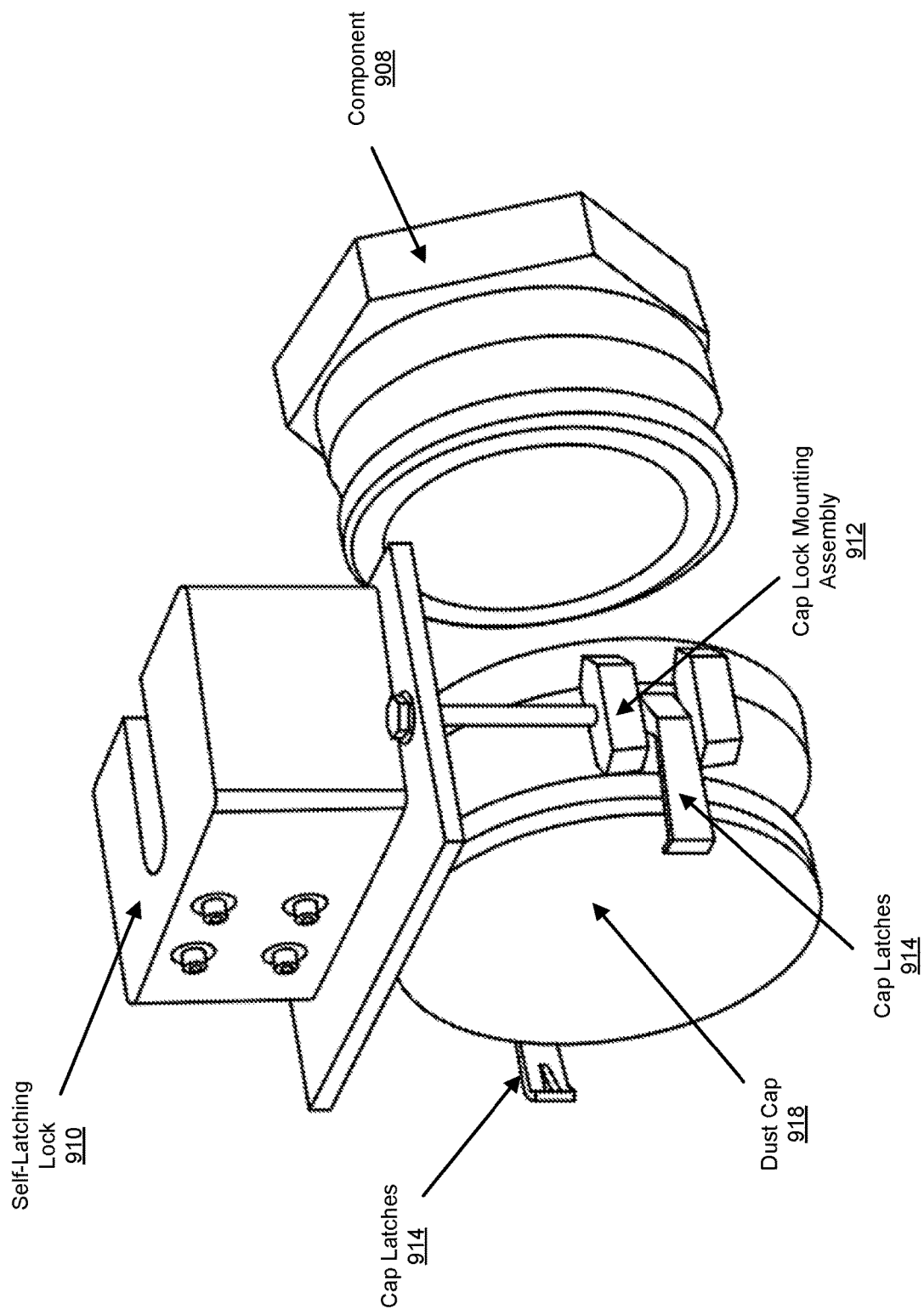
FIG. 9 is a schematic diagram of a close-up exploded view of an example of a dust cap fitted with a pipe lock.

FIG. 9 is a schematic diagram of a close-up exploded view of an example of a dust cap fitted with a pipe lock. As shown in FIG. 9, dust cap 918 is fitted with a locking system that may lock itself to an actuator, thus preventing dust cap 918 from being removed from component 908 without first disengaging the actuator. As described with respect to components 750, 752, 850, and 852 in FIGS. 7 and 8, component 908 may be part of an adapter system that is configured to provide structural support to one or more parts of a pipe lock system without necessitating major alterations to existing infrastructure.

Cap lock mounting assembly 912 may secure self-latching lock 910 to dust cap 918 as well as securing cap latches 914 in place against dust cap 918 to prevent tampering. Cap lock mounting assembly 912 may include a base plate for self-latching lock 910, screws to affix the base plate through holes in brackets incorporated into dust cap 918 and/or cap latches 914, pins, bolts, or any other suitable method of affixing self-latching lock 910 to dust cap 918. The cap latches 914 and cap lock mounting assembly 912 may therefore be permanently or semi-permanently attached to dust cap 918 so that dust cap 918 cannot be easily removed from the self-latching lock 910. For example, cap latches 914 and cap lock mounting assembly 912 may be permanently attached to the dust cap 918 such that those components may only be destructively separated. In another example, cap latches 914 and cap lock mounting assembly 912 may be permanently attached to the dust cap 918 such that those components may only be separated with the use of tools (e.g., screwdriver, wrenches, ratchets, etc.). As shown in this close-up view, the housing of self-latching lock 910 largely encloses the internal components to protect them from weather, tampering, and general wear and tear. However, the housing includes a groove to allow an extendable or movable portion of an actuator to engage with the locking components inside the housing when dust cap 918 is pressed against the end of component 908. Cap latches 914, meanwhile, may be configured to engage with a circular groove around the periphery of dust cap 918. Cap latches 914 may be configured with cam shapes or other shapes suitable for fastening to grooves formed into the side of dust cap 918. In some embodiments, cap latches 914 may allow a delivery agent, site manager, or other on-site personnel to manually detach self-latching lock 910 from dust cap 918 (e.g., using tools where the components are semi-permanently attached) in the event of a locking mechanism failure that prevents dust cap 918 from being removed from component 908 despite a delivery being authorized and/or validated by the backend control system.

Figure 10:
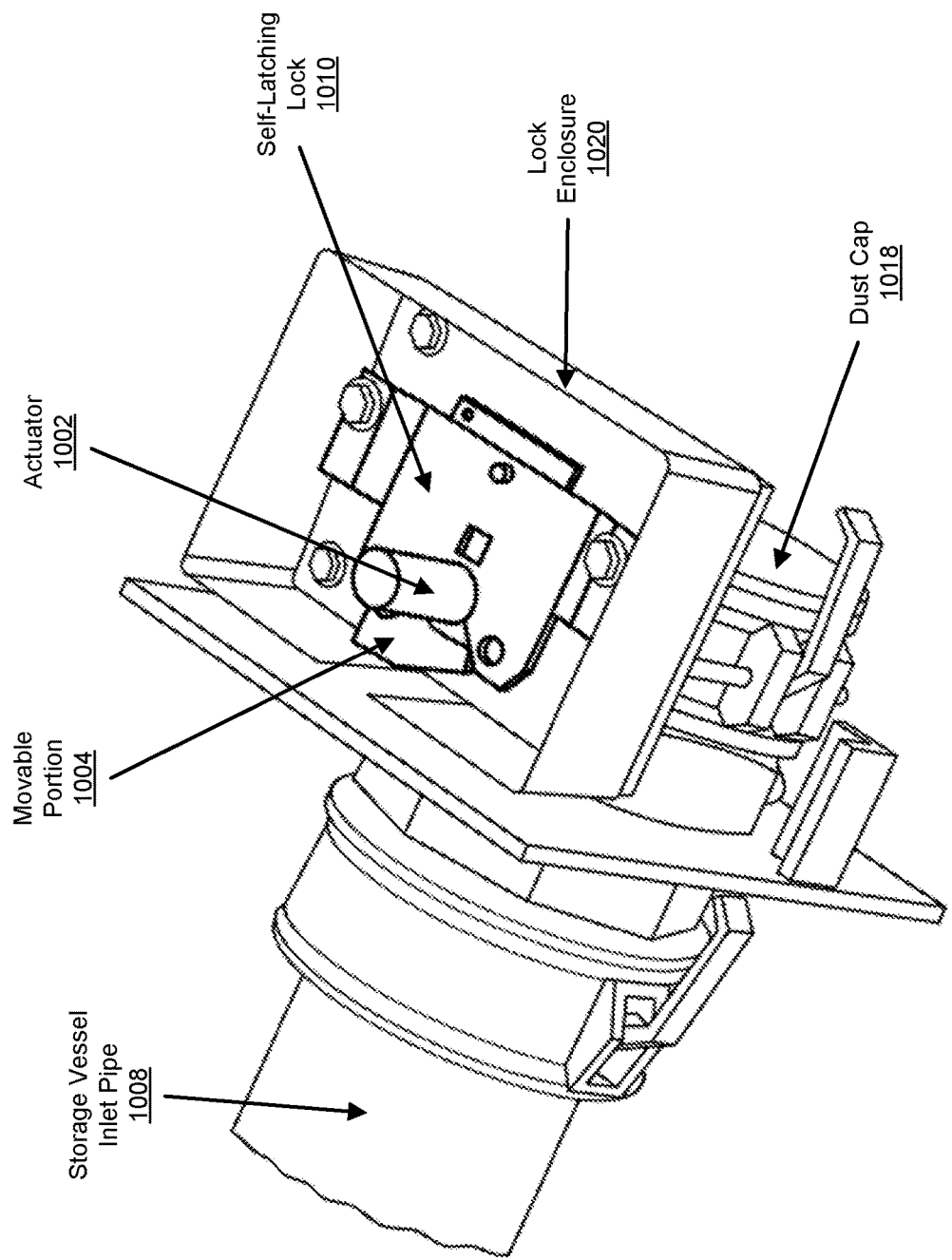
FIG. 10 is a schematic diagram of a closeup cutaway view of an example latching assembly for a pipe lock.

FIG. 10 is a schematic diagram of a closeup cutaway view of an example latching assembly for a pipe lock. As described above in connection with other figures described herein, a self-latching lock 1010 may be configured to secure to an actuator 1002. Self-latching lock 1010 may be mounted within enclosed by a lock enclosure 1020 to protect it from the elements and/or tampering. Self-latching lock 1010 may also include a movable portion 1004 that is configured to move aside when actuator 1002 is pressed into self-latching lock 1010 (e.g., when dust cap 1018 is pressed into place over an opening of storage vessel inlet pipe 1008), thereby admitting actuator 1002 into a locking groove of self-latching lock 1010, but not move when lock enclosure 1020 is pulled away from actuator 1002. Lock enclosure 1020 may be secured to dust cap 1018 by a mounting assembly. Dust cap 1018 may prevent material from entering storage vessel inlet pipe 1008 when affixed to an end of storage vessel inlet pipe 1008.

Figure 11:
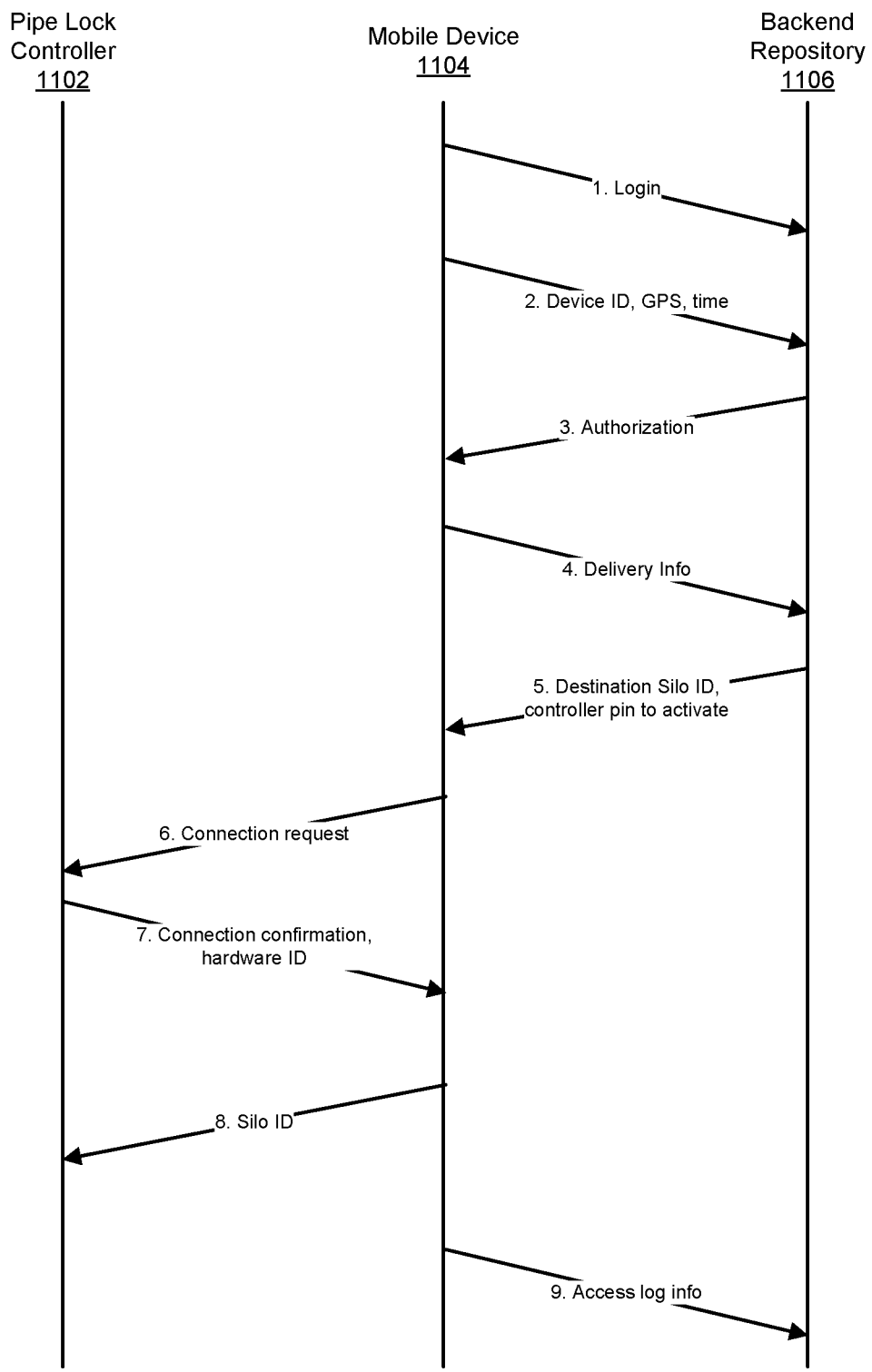
FIG. 11 is a schematic diagram of method for controlling an electronic pipe lock with a computing device in accordance with various embodiments described herein.

The above-described inlet pipe locking system may be controllable by a cloud-based logistics system. In these examples, customers may register with an online service to manage their storage vessels. The customers may then install pipe locks and control units as appropriate, and register their facility locations, storage vessels, locking devices, and authorized personnel lists with the online service. The online service may allow customers to provide additional details about their site, such as which materials belong in which storage vessels, which pipe locks are stationed at which storage vessels, etc. For example, FIG. 11 shows a schematic diagram of method for controlling an electronic pipe lock with a computing device in accordance with various embodiments described herein. For example, the customer may establish a single storage vessel-to-material pairing for each electronic lock to be associated with a particular inlet pipe for a particular storage vessel.

When the customer places an order for a material, the customer may register the purchase order with an online service that maintains a backend repository 1106 for managing electronic pipe locks. The purchase order registration may include a variety of information, such as a purchase order identifier or number, the material purchased (e.g., a customer product code), destination facility, storage vessel identifier or number, delivery date and time, and order quantity. The online service then matches the purchase order to the correct storage vessel and corresponding pipe lock at the destination facility.

When the vehicle with the ordered material arrives at the customer plant, a logistics manager, vehicle driver, or other authorized user may, at operation 1, log in to the online service (e.g., via an app) on mobile device 1104. Once the login has been confirmed by backend repository 1106, mobile device 1104 may transmit additional information to backend repository 1106, such as a device ID and/or location information to ensure that the delivery is at the correct plant and/or at the correction location at a given plant. For example, at operation 2, a smart phone of the user may send to the online service GPS or other geolocation data along with a device ID of mobile device 1104 as well as a time of access. The online service may also take into account the date, time of day, day of the week, etc. to verify details of the order/delivery match up with what is expected.

The smart phone may also receive a unique ID through local communication with any nearby electronic locks (e.g., through Bluetooth), which may be sent back to the online service to aid in validation (e.g., verify that the driver is at the correct location). If the validation process fails, the online system notifies the authorized user of an error. If the validation process passes, at operation 3 the backend repository 1106 transmits an authorization to mobile device 1104.

At operation 4, the user may, via the app on mobile device 1104, enter in the purchase order information from the vehicle driver's physical paperwork (e.g., purchase order number, customer product code, order quantity, Department of Transportation lading number, carrier trailer number, security trailer's seals, actual delivery date and time, identity of delivery driver and/or company, etc.). Backend repository 1106 may capture the login information and session information of the user entering this information to serve as an audit log and protect against malicious actors. The online service may capture any other appropriate delivery information for customer analysis, reporting, and integrating into inventory planning systems. For example, a user may capture a photo of a shipping invoice or related paperwork via mobile device 1104 and transmit the image to backend repository 1106. Backend repository 1106 may store the image and/or process the image to extract relevant information. Once the information from the physical paperwork for the delivery has been provided to backend repository 1106, the online service validates key order information including but not limited to the purchase order number, material, and whether the customer had a delivery scheduled for that day, etc. If the delivery information does not match up with an expected delivery, backend repository 1106 may notify the user (e.g., via an alert on the app or a user interface of mobile device 1104).

If the delivery information is validated by backend repository 1106, backend repository 1106 may send confirmation to mobile device 1104 at operation 5. This confirmation can include, for example, a destination silo ID as well as a controller pin to activate. In some embodiments, backend repository 1106 prompt a user to select a silo to unlock from one or more appropriate receiving silos for the material in the shipment either before or after transmitting the confirmation information. That is, in situations where the correct silo for loading could be ambiguous (e.g., there are multiple eligible silos to receive the shipment), backend repository 1106 or the app installed on mobile device 1104 can prompt the user to select which silo they wish to unlock.

At operation 6, mobile device 1104 may send a connection request to pipe lock controller 1102. Pipe lock controller 1102 may respond at operation 7 with a connection confirmation that in some embodiments can include a hardware ID of pipe lock controller 1102 to help mobile device 1104 uniquely identify pipe lock controller 1102. In some embodiments, mobile device 1104 may also communicate with all nearby locks (e.g., through Bluetooth or other short range communication protocol), so that mobile device 1104 may display which nearby locks are present. The user may select a lock that they believe should be unlocked and/or backend repository 1106 may determine the appropriate lock to unlock based on the validation process described above. The locks may be labeled (e.g., with a unique code or alphanumeric string, or with cuing systems such as lights) so that the user may associate the locks they see with those displayed on the user interface of mobile device 1104. In addition, once a lock is actually unlocked, mobile device 1104 may display the code or other label associated with that lock so the user may identify which lock has been unlocked.

At operation 8, mobile device 1104 may transmit a signal to pipe lock controller 1102 for the appropriate storage vessel (e.g., a silo ID, pin ID, or other information that uniquely identifies the lock to be unlocked) and signals pipe lock controller 1102 to unlock the appropriate pipe lock by causing the appropriate actuator to retract. When the actuator is retracted, the cap lock may no longer be obstructed by the actuator, allowing the shipping driver to remove the appropriate inlet pipe cap and complete the material delivery. After a predetermined length of time (e.g., 30 seconds), the control unit may release the actuator back into the extended position (e.g., by ceasing the flow of power to the actuator), allowing the driver to reconnect the pipe cap and lock the inlet pipe shut, completing the delivery process. An electronic pipe lock may further include an indicator, such as a light (e.g., LED) that turns on or changes color to indicate that it has been locked or unlocked. In this way, a driver or other person may see which pipe has been unlocked, for example where an array of pipes and locks are present.

At operation 9, mobile device 1104 may transmit access log information to backend repository 1106, including, for example, information regarding the shipment, information uniquely identifying mobile device 1104, information included in the login operation at operation 1, timestamps, hardware IDs of pipe lock controller 1102, or any other suitable information that could aid site personnel in identifying problems should they occur or otherwise auditing pipe lock activity.

In some embodiments, the actuator, mounting plate, or other component of the cap locking system may include a mechanical switch, conductivity sensor, magnetic sensor, RFID sensor, or other sensor to determine when the cap is in place over the inlet pipe. Such a system may enable the control unit to log when caps are removed and replaced. Log entries may include information such as time of cap removal, time of cap replacement, duration of cap removal, storage vessel identifier, or any other relevant information for auditing proper cap lock usage. In some embodiments, log entries may also include information from a sensor that tracks a fill level of the silo, which may be used to aid users in selecting a storage vessel to fill and/or to verify whether a shipment has been properly completed.

Figure 12:
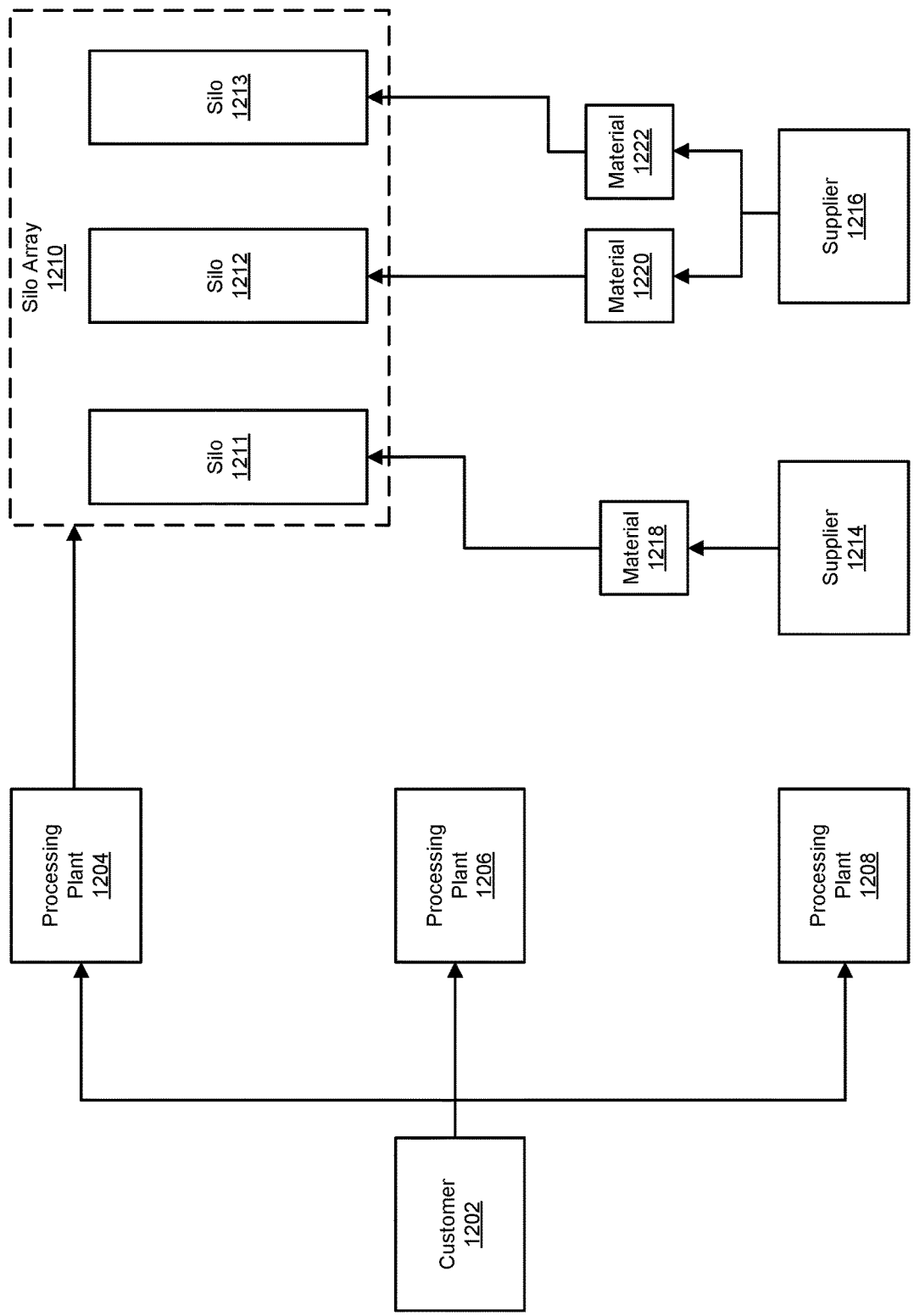
FIG. 12 is a block diagram of an example process flow for controlling pipe locks in accordance with various embodiments described herein.

FIG. 12 is a block diagram of an example process flow for controlling pipe locks. As shown in FIG. 12, a customer 1202 (such as an individual, company, or organization) may operate one or more processing plants. In the example of FIG. 12, customer 1202 operates processing plants 1204, 1206, and 1208, each of which have storage silos for materials, though silos for processing plants 1206 and 1208 are not illustrated here. Processing plant 1204 has an on-site collection of storage silos, which are illustrated as silo 1211, silo 1212, and silo 1213 which are all part of silo array 1210. A silo array may include any number of silos, and a site or processing plant may include any number of silo arrays. Silo array 1210 may represent a group of silos with physically proximate inlet pipes, each equipped with pipe locks all connected to the same control unit. Customer 1202 may purchase supplies from various suppliers such as supplier 1214 and supplier 1216. In this example, supplier 1214 supplies material 1218, which is stored in silo 1211. Supplier 1216 supplies material 1220 and material 1222, which are stored in silo 1212 and 1213 respectively. As described above, information from purchase orders and delivery shipments may be fed into a cloud service that allows on-site personnel to verify shipments and ensure that the correct material is stored in the correct silo (e.g., material 1218 is delivered to and stored in silo 1211 instead of silo 1212) to avoid costly spoilage of stored materials and/or disruption of production processes.

Figure 13:
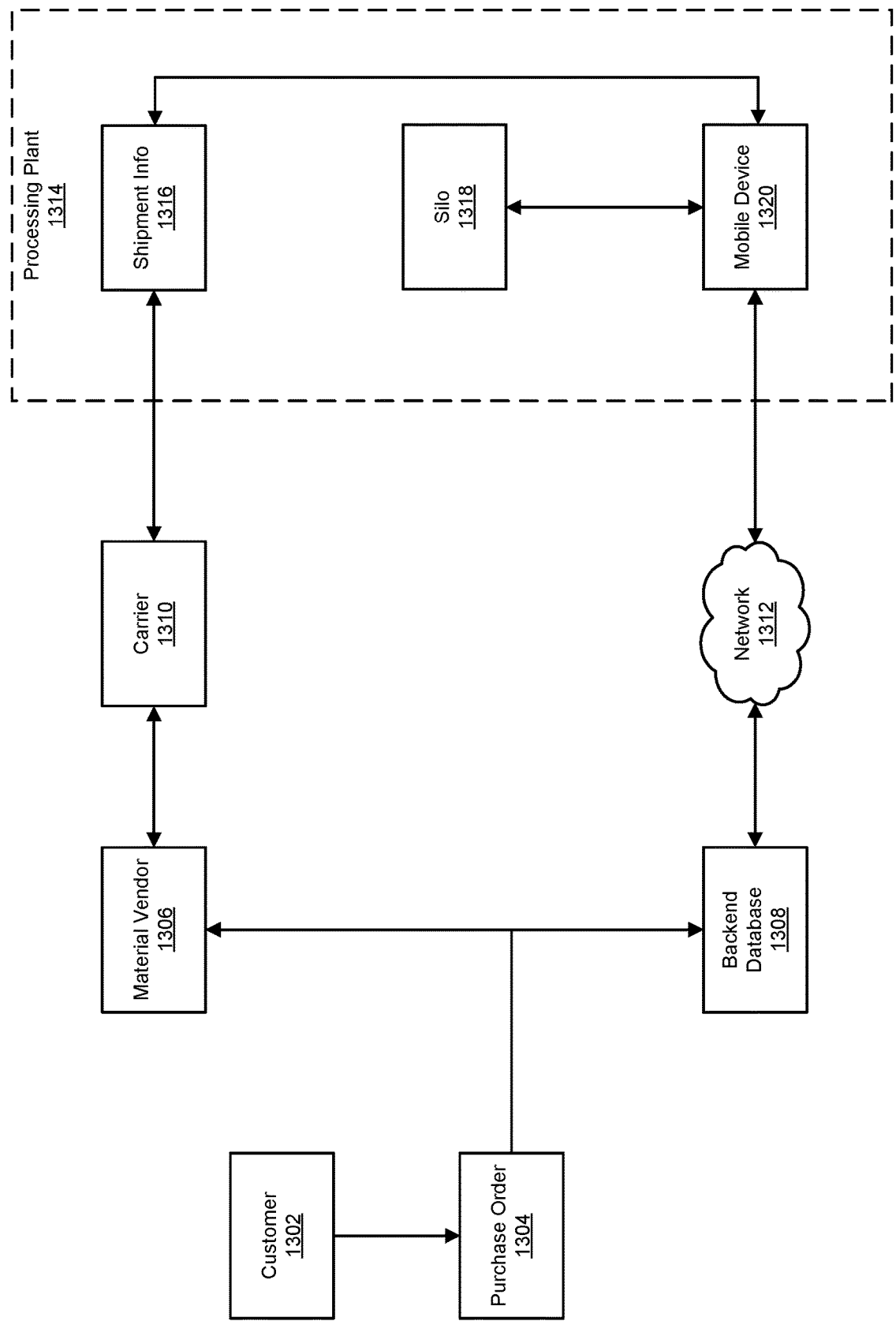
FIG. 13 is a block diagram of an additional example process flow for controlling pipe locks in accordance with various embodiments described herein.

FIG. 13 is a block diagram of an additional example process flow for controlling pipe locks. In this example, a customer 1302 maintains a storage location that includes silo 1318 that stores a particular material. When customer 1302 needs to restock silo 1318, customer 1302 may create a purchase order 1304 to purchase the material from material vendor 1306. Information from purchase order 1304 may be transmitted to material vendor 1306 for purchasing and delivery purposes as well as to a backend database 1308 for delivery verification and pipe lock control at the storage site. When a carrier 1310 (e.g., a physical materials delivery service) delivers the material from material vendor 1306 to the storage site, an operator for carrier 1310 may present shipment info 1316 (such as a shipping manifest, receipt, machine-readable indicia such as a barcode or QR code, data in an RFID tag, etc.) for verification. On-site personnel (e.g., a delivery driver, plant employee, etc.) may input shipment info 1316 (e.g., manually, by scanning machine-readable indicia, by RFID scanning, etc.) into mobile device 1320 which may communicate relevant portions of shipment info 1316 to backend database 1308 over a network 1312 (e.g., a cellular network) for data verification. If backend database 1308 determines that shipment info 1316 matches purchase order 1304, backend database 1308 may provide an indicator of shipment verification back to mobile device 1320, enabling or allowing mobile device 1320 to unlock a pipe lock on an inlet pipe of silo 1318 and allowing personnel to complete the delivery process. If backend database 1308 determines that shipment info 1316 does not match purchase order 1304, backend database 1308 may provide an error code or other indication of the mismatch to mobile device 1320, which may subsequently alert the user that there is a mismatch between shipment info 1316 and purchase order 1304, thereby allowing the user to prevent accidental mixing of incompatible materials in silo 1318.

Mobile device 1320 may communicate with backend database 1308 in a variety of ways. In some examples, mobile device 1320 may connect to a mobile network and transmit data in, for example, an SMS or APP format. In other examples, mobile device 1320 may connect to a WiFi network and communicate with backend database 1308 over the Internet. Mobile device 1320 may also communicate with pipe lock controllers in a variety of ways. In some examples, mobile device 1320 may use nearfield communication (NFC), personal area communication (PAC) such as Bluetooth, or any other suitable short-range communication protocol or system. By using short-range communication, the systems and methods described herein may ensure that mobile device 1320 is within physical proximity to silo 1318, providing a measure of protection against spoofing or other malicious acts that could erroneously unlock an inlet pipe to silo 1318. Given that silos are typically not situated in areas that are physically accessible to the general public, requiring mobile device 1320 to be within physical proximity of silo 1318 to unlock silo 1318 affords an additional layer of protection against malicious actors.

Software systems and other control systems for controlling pipe locks may involve a variety of features, such as the aforementioned remote backend database operating in conjunction with an on-site mobile device that communicates with pipe lock controllers. In one example, a service provider (which may also be a provider and/or manufacturer of pipe locks) that provides backend services for pipe locks may provide software that purchasers may use to register sites, silos, material suppliers, materials, authorized users, silo controllers, and/or any other relevant information. Sites may be associated with one or more physical locations as well as one or more silos. Silos may be associated with specific materials, specific materials provided by more than one supplier, and/or materials as supplied by a specific supplier (e.g., cornstarch from company A in one silo, cornstarch from company B in a different silo) as well as with users who are authorized to unlock the silo. Silo controllers may be associated with the specific silos for whose pipe locks the controller controls.

When a customer, site manager, or other user places an order for a material, they may indicate a destination silo for the material. Information in the purchase order may be cross-checked against the associations mentioned earlier and/or used to ensure that only valid destination silos are presented as options (e.g., silos that store the correct material from the correct supplier). Likewise, purchase order information such as PO number or other indicator may be used at the delivery site to verify a shipment, double check that the shipment is expected (e.g., delivered within an expected delivery timeframe), and/or otherwise ensure that materials are only delivered to silos for which they are intended.

Figure 14:
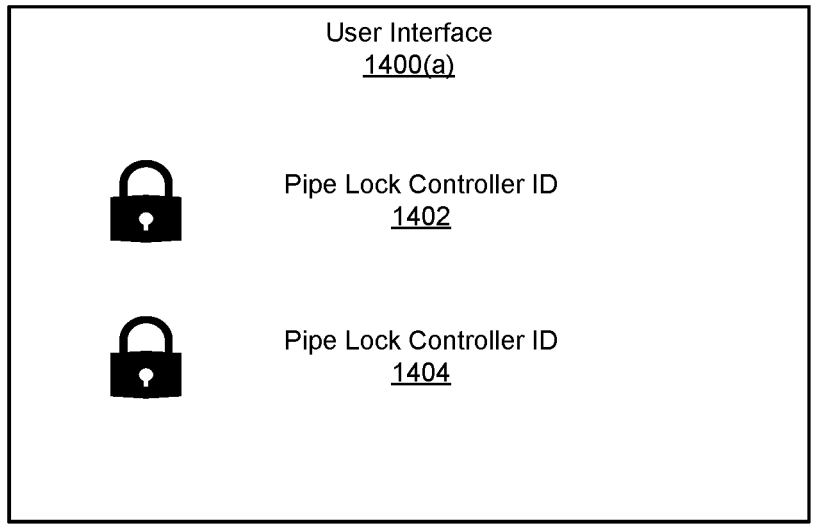
FIG. 14 is diagrams of example user interfaces for controlling pipe locks in accordance with various embodiments described herein.
Figure 14:
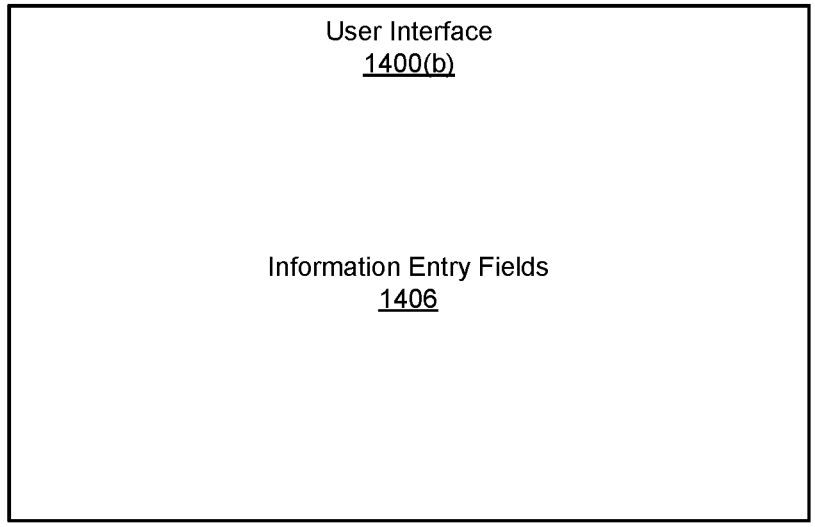

FIG. 14 shows diagrams of example user interfaces for controlling pipe locks from, for example, a mobile device. In the example of FIG. 14, a user interface 1400(a) may be displayed on a screen of a device, such as a tablet, mobile phone, smart glasses, smart watch, etc. User interface 1400(a) may display IDs of pipe lock controllers within signal range, the range of which may be limited by the particular communication protocol being used by the device and/or the pipe lock controllers. In some embodiments, pipe lock controllers may be configured to communicate over a personal area network communications protocol such as Bluetooth. Returning to the example of FIG. 14, user interface 1400(a) shows two pipe lock controllers within signal range, which are identified by pipe lock controller ID 1402 and pipe lock controller ID 1404. These IDs may be numbers, descriptive text, or any other identifier that may aid authorized personnel in identifying unique pipe lock controllers. In some examples, the application may filter controller IDs in range to only show pipe lock controllers that a user is authorized to interact with. A user may select a pipe lock controller for access by tapping on or otherwise selecting the appropriate icon on user interface 1400(a). Once a specific pipe lock controller has been selected for further interaction, user interface 1400(a) may transition into user interface 1400(b), which includes information entry fields 1406 into which the authorized user may enter information such as purchase order number, material identifiers, shipment volumes, and the like. In some embodiments, information entry fields 1406 may be automatically filled out in response to the device scanning machine-readable indicia, such as a barcode, QR code, etc. that may link to an appropriate webpage, database, or other digital resource by which the device may retrieve the information relevant to the shipment of material. As described above, the device may then communicate the information entered into information entry fields 1406 as part of an unlock request to a control backend that may verify the information and provide the device with an identifier of the appropriate pipe lock or pipe locks to unlock. The device may then send unlock signals to the relevant pipe lock controller, unlocking the selected end pipe and allowing the material to be delivered to the proper storage vessel. In cases where there is more than one suitable storage vessel for a single shipment, user interface 1400(b) and/or another phase of user interface 1400 may include a screen prompting the user to select exactly which pipe lock they wish to unlock, selected from pipe locks corresponding to appropriate storage vessels in range and/or connected to the selected pipe lock controller. In some embodiments, the user interface may display information acquired from fill level sensors and display a representation of the fill levels of each appropriate storage vessel. This information may enable users to unlock (and thus fill) the storage vessel with the most empty space and/or enable users to easily track which storage vessels are in need of replenishment. Fill level information can also be used in an audit log to verify that a storage vessel was properly filled after a shipment rather than losing material to leaks or malicious activity.

Although the examples illustrated and described above show a linear actuator that engages with a self-latching lock that includes a moveable portion, other arrangements of actuator and locking mechanism could be used. For example, in some embodiments, the actuator may include a rotary actuator configured to hook around a static shank, hook, or similar feature in the lock enclosure affixed to the dust cap. Alternatively, the actuator could itself include a loop, hook, eyelet, shank, etc. configured to engage with a self-latching lock. Additionally, although electric solenoid actuators are discussed above, actuators could be movable via pneumatic or hydraulic mechanisms as well.

As described in greater detail above, the cap lock systems and control systems described herein may help ensure that bulk materials being stored in large-scale storage solutions such as silos or tanks are delivered to an appropriate storage vessel, thereby reducing material loss due to improper mixing of materials in a storage vessel. Furthermore, the systems and methods described herein may provide for an audit log to help personnel more accurately track material inventories and deliveries. The pipe lock systems described herein may also help secure storage vessels against malicious individuals who seek to deliberately sabotage materials in storage by adding an additional physical barrier to such activities while remaining easy to use for legitimate deliveries.

Figure 15:
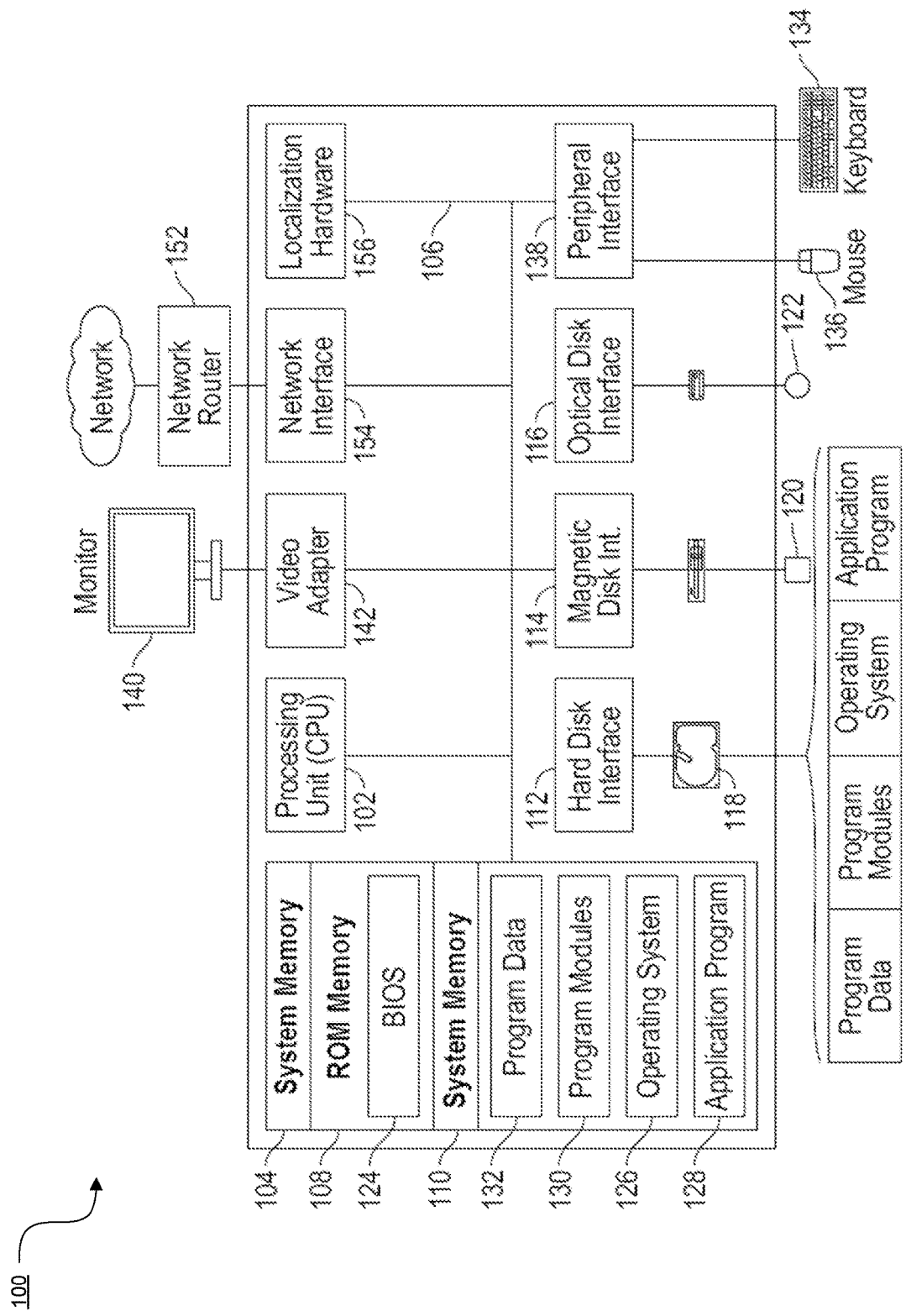
FIG. 15 is a schematic diagram of an example computing system for controlling pipe locks in accordance with various embodiments described herein.

As described above, one or more computing devices and/or computing systems may be involved in managing access to storage vessel pipe inlets. FIG. 15 is a diagrammatic view of an example of a computing environment that includes a general-purpose computing system 100, such as a desktop computer, laptop, smartphone, tablet, or any other such device having the ability to execute instructions, such as those stored within a non-transient, computer-readable medium. Various computing devices as disclosed herein (e.g., pipe lock controller 1102, mobile device 1104, backend repository 1106, backend database 1308, mobile device 1320, and/or any other computing device) may be similar to the computing system 100 or may include some components of the computing system 100. Furthermore, while described and illustrated in the context of a single computing system 100, those skilled in the art will also appreciate that the various tasks described hereinafter may be practiced in a distributed environment having multiple computing systems 100 linked via a local or wide-area network in which the executable instructions may be associated with and/or executed by one or more of multiple computing systems 100. Various methods described herein may be implemented with such a computing system 100 or various components of the computing system 100, including the control of pipe locks, pipe lock arrays, etc. These components may be controlled based on predetermined schedules, such as schedules set by a user with a user interface of the computing system 100. Various portions of the methods described herein may further be fully or partially implemented or controlled using the computing system 100 or aspects of the computing system 100.

In its most basic configuration, computing system 100 typically includes at least one processing unit 102 and at least one memory 104, which may be linked via a bus 106. Depending on the exact configuration and type of computing system, memory 104 may be volatile (such as RAM 110), non-volatile (such as ROM 108, flash memory, etc.) or some combination of the two. Computing system 100 may have additional features and/or functionality. For example, computing system 100 may also include additional storage (removable and/or non-removable) including, but not limited to, magnetic or optical disks, tape drives and/or flash drives. Such additional memory devices may be made accessible to the computing system 100 by means of, for example, a hard disk drive interface 112, a magnetic disk drive interface 114, and/or an optical disk drive interface 116. As will be understood, these devices, which would be linked to the system bus 106, respectively, allow for reading from and writing to a hard drive 118, reading from or writing to a removable magnetic disk 120, and/or for reading from or writing to a removable optical disk 122, such as a CD/DVD ROM or other optical media. The drive interfaces and their associated computer-readable media allow for the nonvolatile storage of computer readable instructions, data structures, program modules and other data for the computing system 100. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system 100.

A number of program modules may be stored in one or more of the memory/media devices. For example, a basic input/output system (BIOS) 124, containing the basic routines that help to transfer information between elements within the computing system 100, such as during start-up, may be stored in ROM 108. Similarly, RAM 110, hard drive 118, and/or peripheral memory devices may be used to store computer executable instructions including an operating system 126, one or more applications programs 128 (which may include the functionality disclosed herein, for example), other program modules 130, and/or program data stored on hard drive 118. Still further, computer-executable instructions may be downloaded to the computing system 100 as needed, for example, via a network connection.

An end-user may enter commands and information into the computing system 100 through input devices such as a keyboard 134 and/or a pointing device 136. While not illustrated, other input devices may include a microphone, a joystick, a game pad, a scanner, etc. These and other input devices would typically be connected to the processing unit 102 by means of a peripheral interface 138 which, in turn, would be coupled to bus 106. Input devices may be directly or indirectly connected to processing unit 102 via interfaces such as, for example, a parallel port, game port, firewire, or a universal serial bus (USB). To view information from the computing system 100, a monitor 140 or other type of display device may also be connected to bus 106 via an interface, such as via video adapter 132. In addition to the monitor 140, the computing system 100 may also include other peripheral output devices, not shown, such as speakers and printers.

The computing system 100 may also utilize logical connections to one or more computing systems. Communications between the computing system 100 and the remote computing system may be exchanged via a further processing device, such a network router 152, that is responsible for network routing. Communications with the network router 152 may be performed via a network interface component 154. Thus, within such a networked environment, e.g., the Internet, World Wide Web, LAN, or other like type of wired or wireless network, it will be appreciated that program modules depicted relative to the computing system 100, or portions thereof, may be stored in the memory storage device(s) of the computing system 100.

The computing system 100 may also include localization hardware 186 for determining a location of the computing system 100. In some instances, the localization hardware 156 may include, for example only, a GPS antenna, an RFID chip or reader, a WiFi antenna, or other computing hardware that may be used to capture or transmit signals that may be used to determine the location of the computing system 100.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure. Logistics and receiving personnel can later view these logs to verify that the cap lock system is being used correctly.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
    an actuator comprising a movable portion configured to move between a first position and a second position, the actuator being configured to attach to an inlet pipe;
    a cap lock configured to:
        attach to a cap of the inlet pipe;
        attach to the movable portion of the actuator to lock the cap over an opening of the inlet pipe while:
            the cap is attached to an opening of the inlet pipe; and
            the movable portion is in the first position; and
        detach from the movable portion of the actuator while the movable portion is in the second position; and
    a control unit configured to, in response to receipt of data indicative of an unlock request, cause the actuator to move the movable portion of the actuator from the first position to the second position.

2. The apparatus of claim 1, wherein:
    the data is received at the control unit from a computing device; and
    the computing device sends the data to the control unit based on a verification that a materials shipment is destined for a storage vessel connected to the inlet pipe.

3. The apparatus of claim 1, wherein the actuator comprises a linear actuator and the movable portion comprises a shaft.

4. The apparatus of claim 3, wherein the first position of the movable portion comprises an extended position of the shaft.

5. The apparatus of claim 1, wherein the actuator comprises a rotary actuator.

6. The apparatus of claim 1, further comprising a mounting plate configured to mount to the inlet pipe and support an enclosure of the actuator in position relative to the inlet pipe.

7. The apparatus of claim 1, wherein the data is first data and the actuator is a first actuator of a plurality of actuators, and wherein the control unit is further configured to:
    control each of the plurality of actuators associated with a plurality of inlet pipes, wherein the control unit is further configured to control, in response to receipt of second data indicative of a second unlock request.

8. The apparatus of claim 1, wherein the actuator comprises a spring that causes the movable portion of the actuator to move to the first position in the absence of a signal from the control unit.

9. The apparatus of claim 1, wherein the control unit is configured to cause the movable portion of the actuator to move from the second position to the first position after a predetermined length of time at the second position.

10. The apparatus of claim 1, wherein the cap lock and the cap are together configured to restrict the cap from being attached to the opening of the inlet pipe in orientations in which the cap lock does not engage with the movable portion of the actuator while the actuator is in the first position.

11. A system comprising:
a pipe lock comprising:
an actuator comprising a movable portion configured to move between a first position and a second position, the actuator being configured to attach to an inlet pipe;
a cap lock configured to:
attach to a cap of the inlet pipe;
attach to the movable portion of the actuator to lock the cap over an opening of the inlet pipe while:
the cap is attached to an opening of the inlet pipe; and
the movable portion is in the first position; and
detach from the movable portion of the actuator while the movable portion is in the second position; and
a control unit configured to, in response to receipt of data indicative of an unlock request, cause the actuator to move the movable portion of the actuator from the first position to the second position; and
a computing device configured to send the data indicative of the unlock request based on a confirmation of shipment details of a material destined for storage in a storage vessel connected to the inlet pipe.

12. The system of claim 11, wherein:
the data is received at the control unit from a computing device; and
the computing device sends the data to the control unit based on a verification that a materials shipment is destined for a storage vessel connected to the inlet pipe.

13. The system of claim 11, wherein the actuator comprises a linear actuator and the movable portion comprises a shaft.

14. The system of claim 13, wherein the first position of the movable portion comprises an extended position of the shaft.

15. The system of claim 11, wherein the actuator comprises a rotary actuator.

16. The system of claim 11, further comprising a mounting plate configured to mount to the inlet pipe and support an enclosure of the actuator in position relative to the inlet pipe.

17. The system of claim 11, wherein the data is first data and the actuator is a first actuator of a plurality of actuators, and wherein the control unit is further configured to:
control each of the plurality of actuators associated with a plurality of inlet pipes, wherein the control unit is further configured to control, in response to receipt of second data indicative of a second unlock request.

18. A computer-implemented method comprising:
receiving, at a processor of a first computing device, first data indicative of at least one of:
shipment information pertaining to a physical shipment of material destined for storage in a designated storage vessel; or
identification information of a pipe lock, pipe lock controller, or inlet pipe associated with one or more storage vessels comprising at least the designated storage vessel;
sending, by the processor, at least a portion of the first data to a second computing device;
receiving, at the processor from the second computing device, second data indicative of a designated inlet pipe associated with the designated storage vessel; and
sending, by the processor based at least in part on the second data, third data indicative of an unlock request to a designated pipe lock controller configured to unlock a designated pipe lock that secures the designated inlet pipe of the designated storage vessel.

19. The computer-implemented method of claim 18, wherein receiving the first data comprises scanning a machine-readable indicium.

20. The computer-implemented method of claim 18, further comprising sending, by the processor to the second computing device, fourth data indicative of an entry for storage in a memory associated with the second computing device, the entry indicative of the material being successfully delivered to the designated storage vessel.

* * * * *